United States Patent [19]

Flamme et al.

[11] Patent Number: 5,924,371
[45] Date of Patent: Jul. 20, 1999

[54] GLOBAL CONTROLLER AND DISTRIBUTED LOCAL CONTROLLER(S) FOR AN AGRICULTURAL IMPLEMENT

[75] Inventors: David D. Flamme, Hinsdale; Abraham Orbach, Naperville; Paul W. Haack, Crystal Lake; Eric D. Jacobson, Downers Grove, all of Ill.

[73] Assignee: Case Corporation, Racine, Wis.

[21] Appl. No.: 08/935,406

[22] Filed: Sep. 23, 1997

[51] Int. Cl.$^6$ .......................... G06F 165/00; G05B 15/00; B65D 83/06
[52] U.S. Cl. .......................... 111/177; 111/200; 111/903; 701/50
[58] Field of Search .................................... 111/177, 170, 111/200, 903; 701/50; 221/211

[56] References Cited

U.S. PATENT DOCUMENTS

| | | |
|---|---|---|
| 3,762,603 | 10/1973 | Bauman et al. . |
| 3,848,552 | 11/1974 | Bauman et al. . |
| 3,860,146 | 1/1975 | Bauman et al. . |
| 3,885,704 | 5/1975 | Lienemann et al. . |
| 4,013,875 | 3/1977 | McGlynn . |
| 4,148,414 | 4/1979 | Parks, Jr. . |
| 4,296,409 | 10/1981 | Whitaker et al. . |
| 4,333,096 | 6/1982 | Jenkins et al. . |
| 4,365,672 | 12/1982 | Robinson, Jr. et al. . |
| 4,381,036 | 4/1983 | Fardal et al. . |
| 4,413,685 | 11/1983 | Gremelspacher et al. . |
| 4,467,872 | 8/1984 | Hodapp . |
| 4,488,476 | 12/1984 | Diel et al. . |
| 4,523,280 | 6/1985 | Bachman . |
| 4,530,463 | 7/1985 | Hiniker et al. . |
| 4,653,410 | 3/1987 | Typpi . |
| 4,721,168 | 1/1988 | Kinzenbaw . |
| 4,747,301 | 5/1988 | Bellanger . |
| 4,803,626 | 2/1989 | Bachman et al. . |
| 5,025,951 | 6/1991 | Hook et al. ............................. 111/177 |
| 5,220,876 | 6/1993 | Monson et al. ..................... 111/200 X |

(List continued on next page.)

OTHER PUBLICATIONS

Operators Manual, 955 Planter Cyclo Air 12/23 Solid Row Crop Front Fold, Rac 9–29280, Case Corporation, Dec. 1996, 14 excerpts.

Drills 5400 and 5500 Soybean Special Pamphlet, No. AE 174086, Case Corporation, 1996, 1 page.

Early Riser 955 Series Cyclo Air Planters Pamphlet, No. AE 17086, Case Corporation, 1996, 1 page.

Early Riser Cyclo Air and Plate Planters, RC Cultivators and Hoes Pamphlet, No. AE 101055, Case Corporation, 1995, 2 pages.

*Primary Examiner*—Christopher J. Novosad
*Attorney, Agent, or Firm*—Foley & Lardner

[57] ABSTRACT

A control system for agricultural implements such as planters, conventional or air drills is disclosed herein. The implement has a frame with multiple sections and each section has a plurality of row units to apply product to multiple rows in a field. The implement is equipped with global output devices (e.g., lights, actuators for moving moveable frame members, actuators for moving markers) to perform global implement functions in response to global control signals. Each section includes one or more local product metering devices for applying products at varying rates in response to local control signals. The products include seed, fertilizer, insecticide and herbicide. The control system includes command sources (e.g., a lighting connector; an operator interface in the cab) to generate global commands for the global implement functions and to generate local rate commands for the metering devices. The control system further includes a global controller, and local controllers corresponding to the sections. The global controller receives the global commands for the global implement functions and generates the global control signals therefrom. The local controllers receive the local rate commands for the local product metering devices and generate the local control signals therefrom.

23 Claims, 31 Drawing Sheets

5,924,371
Page 2

U.S. PATENT DOCUMENTS

| | | |
|---|---|---|
| 5,232,054 | 8/1993 | Van Blaricon et al. . |
| 5,260,875 | 11/1993 | Tofte et al. . |
| 5,424,957 | 6/1995 | Kerkhoff et al. . |
| 5,431,117 | 7/1995 | Steffens et al. . |
| 5,488,817 | 2/1996 | Paquet et al. . |
| 5,498,929 | 3/1996 | Formwalt, Jr. . |
| 5,574,657 | 11/1996 | Tofte et al. . |
| 5,581,235 | 12/1996 | Hollstein . |
| 5,598,794 | 2/1997 | Harms et al. ............ 111/177 |
| 5,621,666 | 4/1997 | O'Neall et al. . |
| 5,635,911 | 6/1997 | Landers et al. ............ 111/903 X |
| 5,721,679 | 2/1998 | Monson ............ 701/50 X |
| 5,737,221 | 4/1998 | Newton ............ 701/50 |
| 5,757,640 | 5/1998 | Monson ............ 701/50 X |

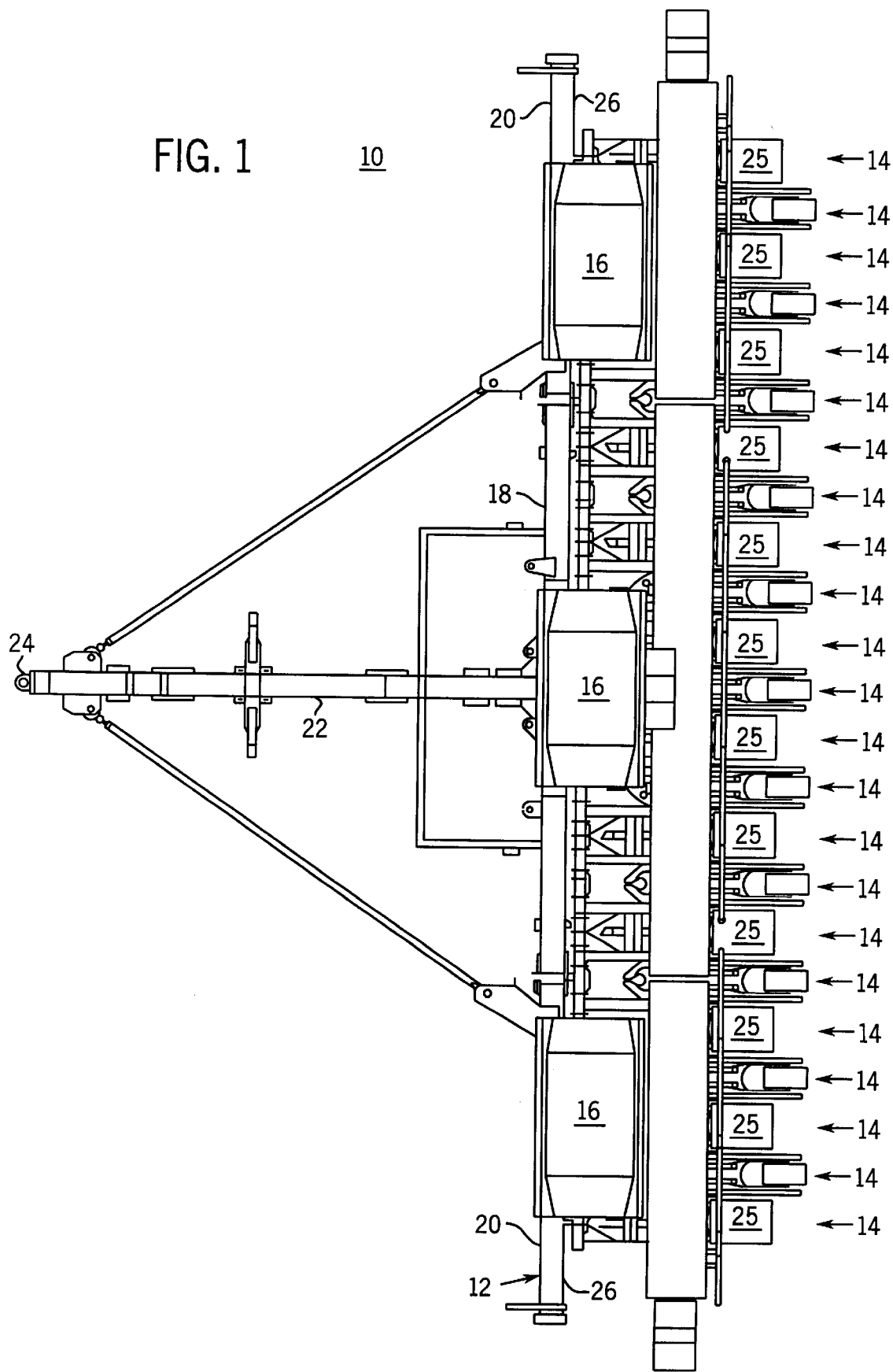

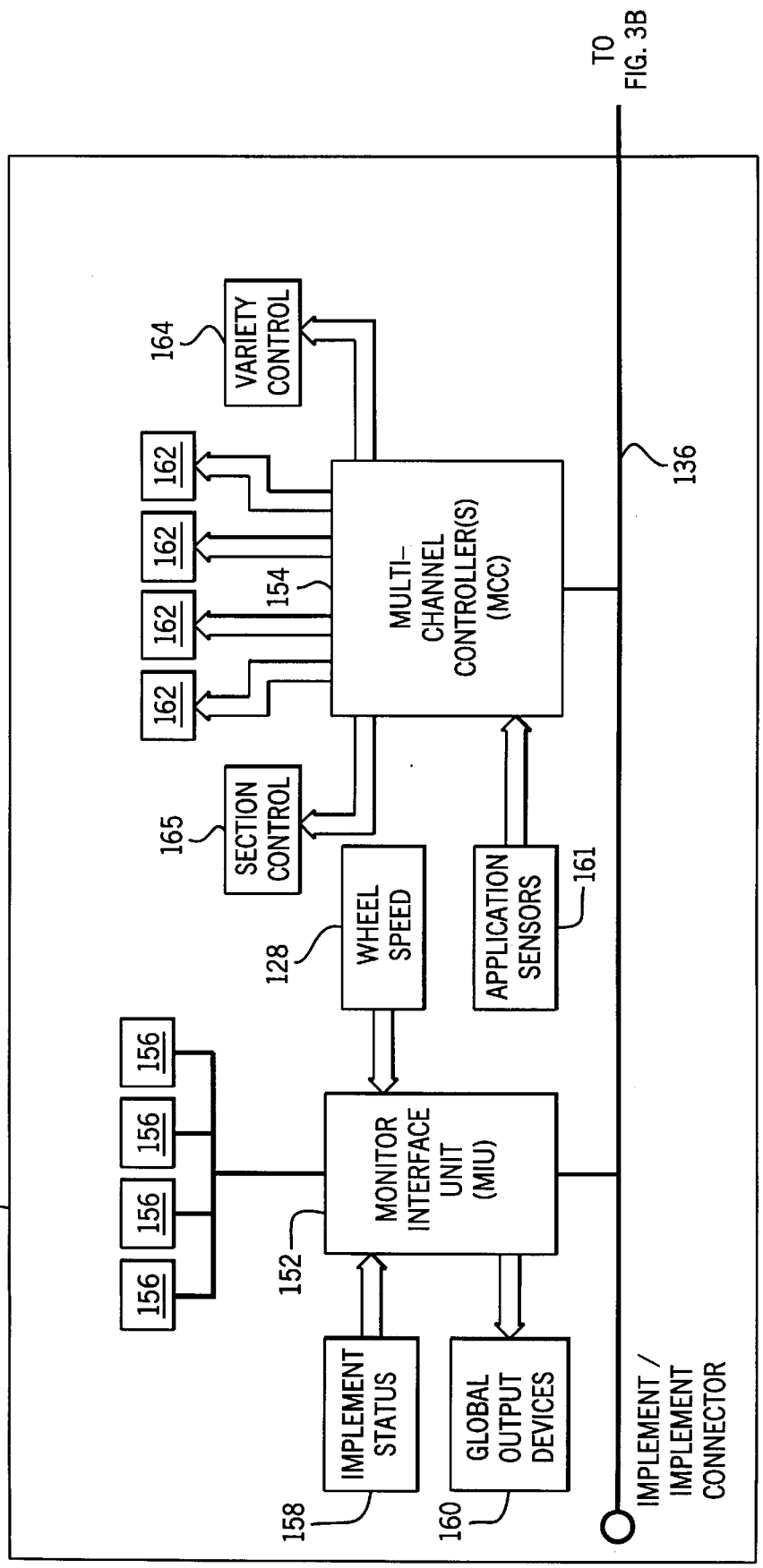

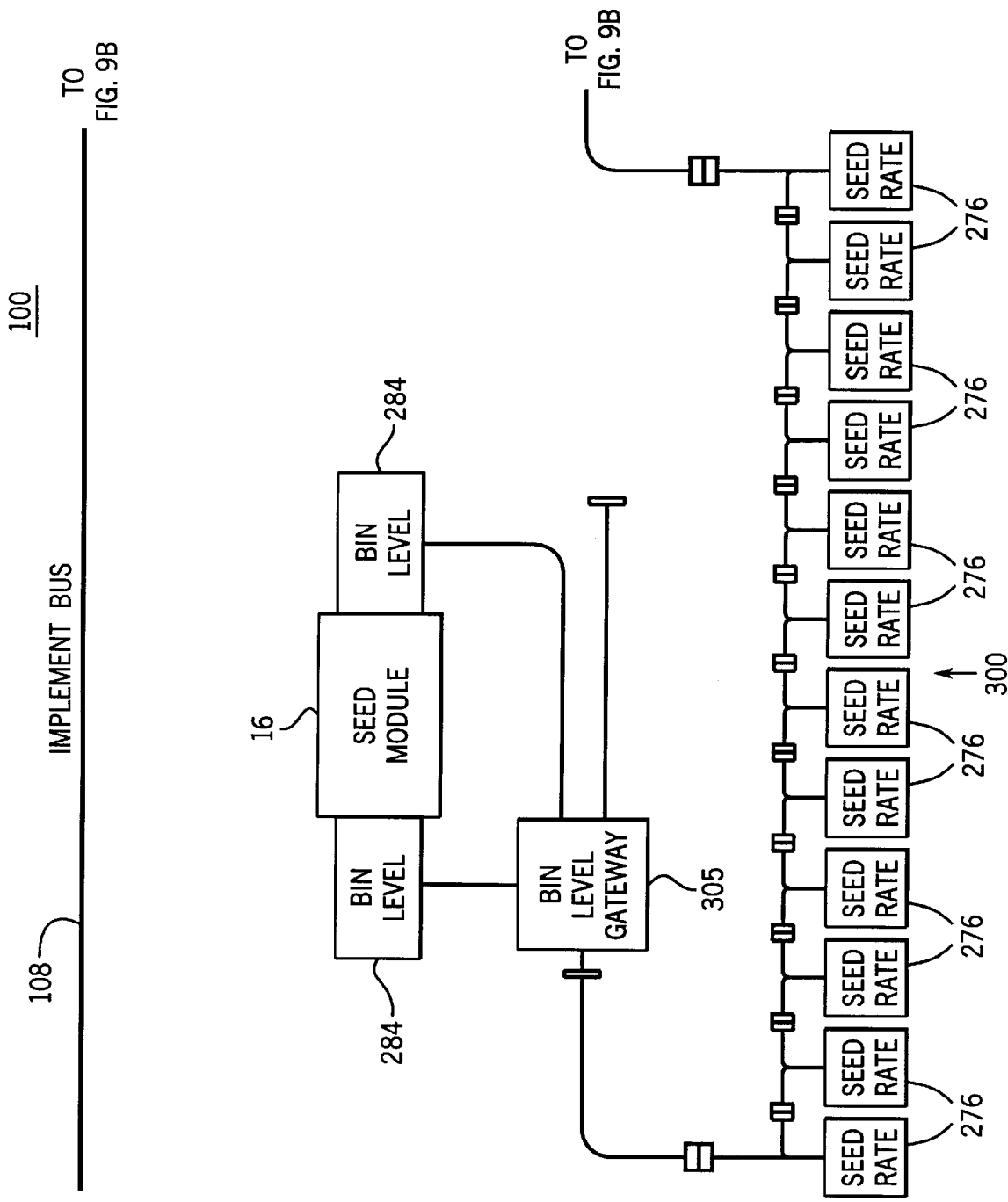

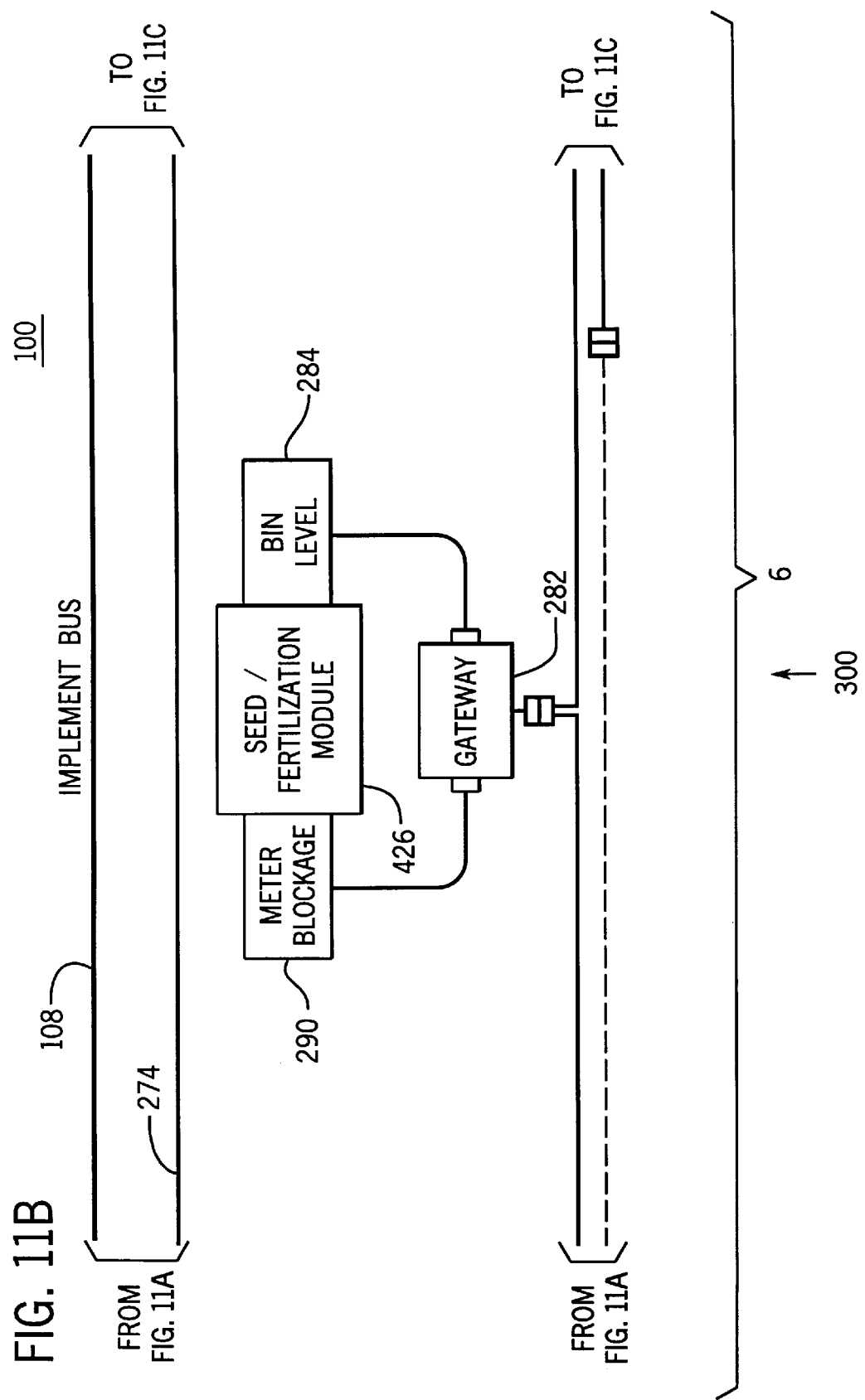

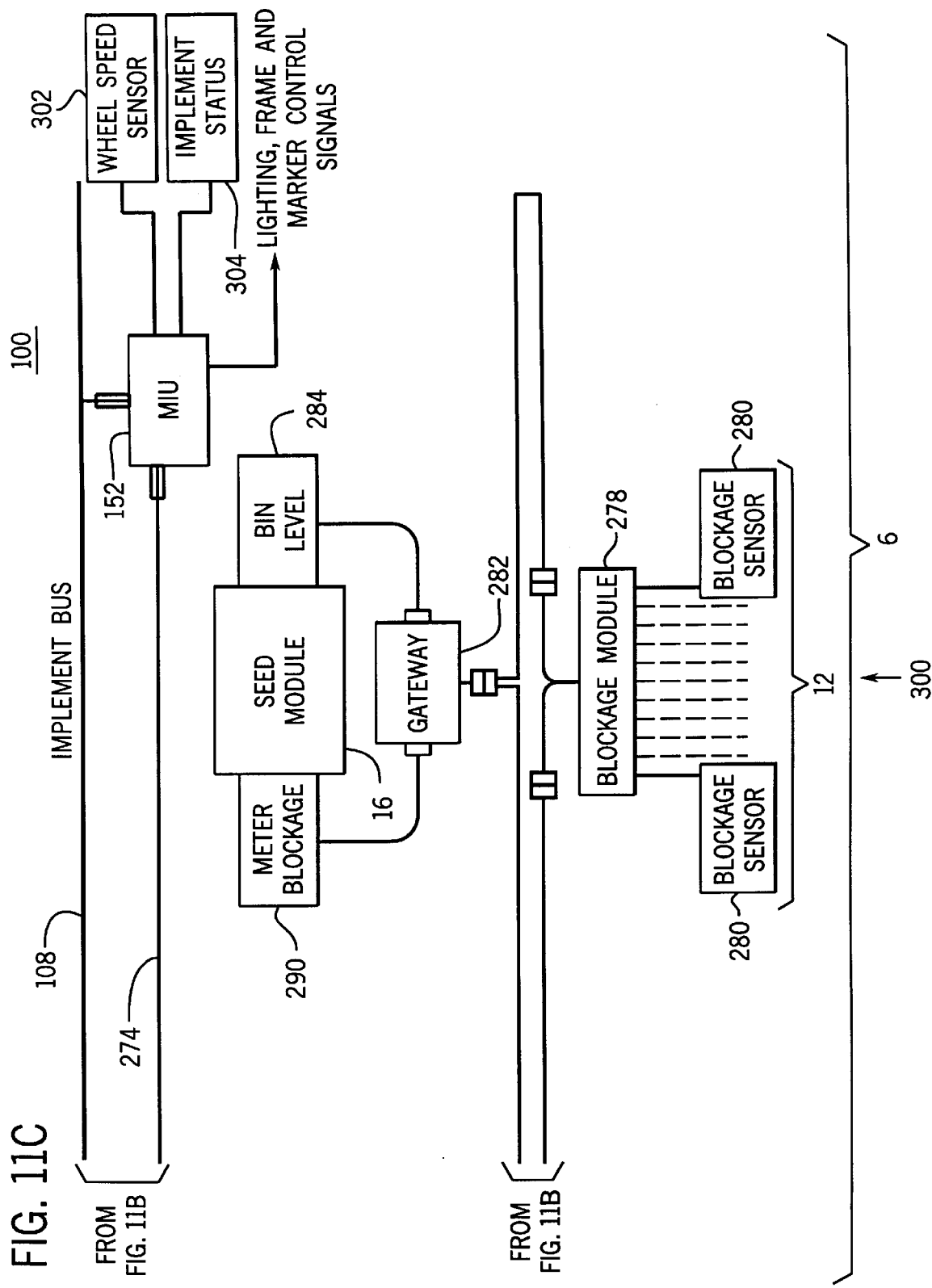

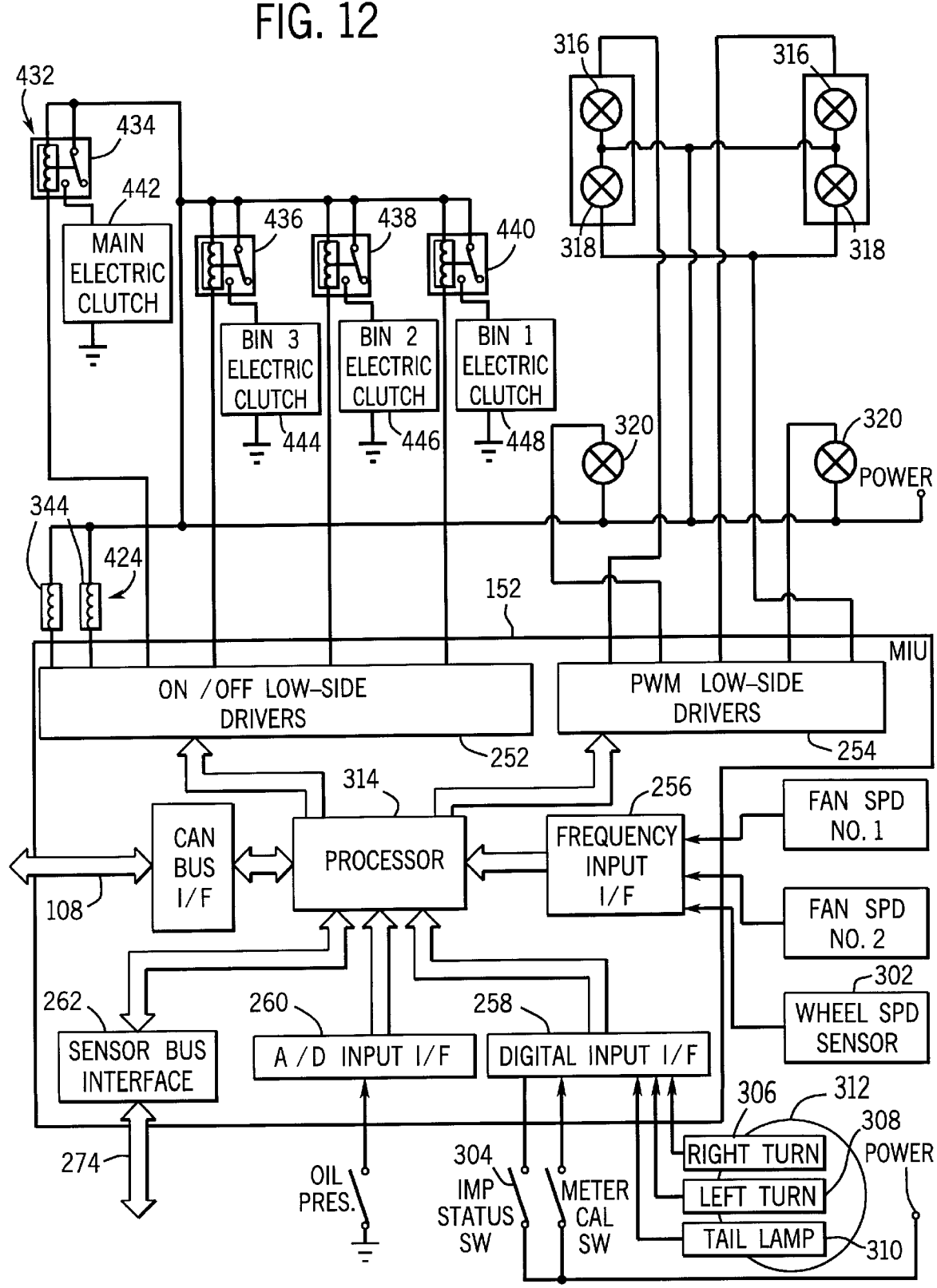

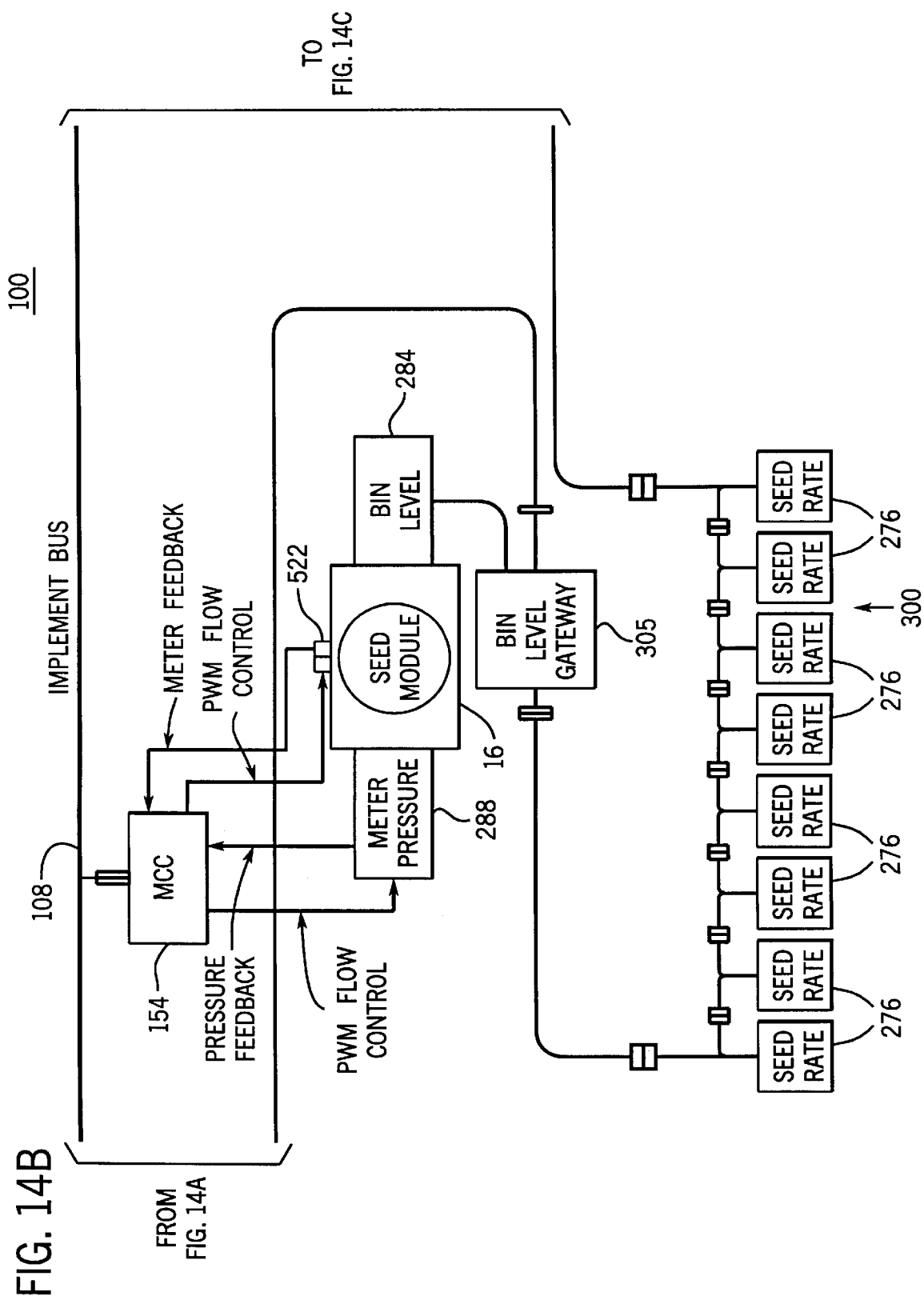

FIG. 17A

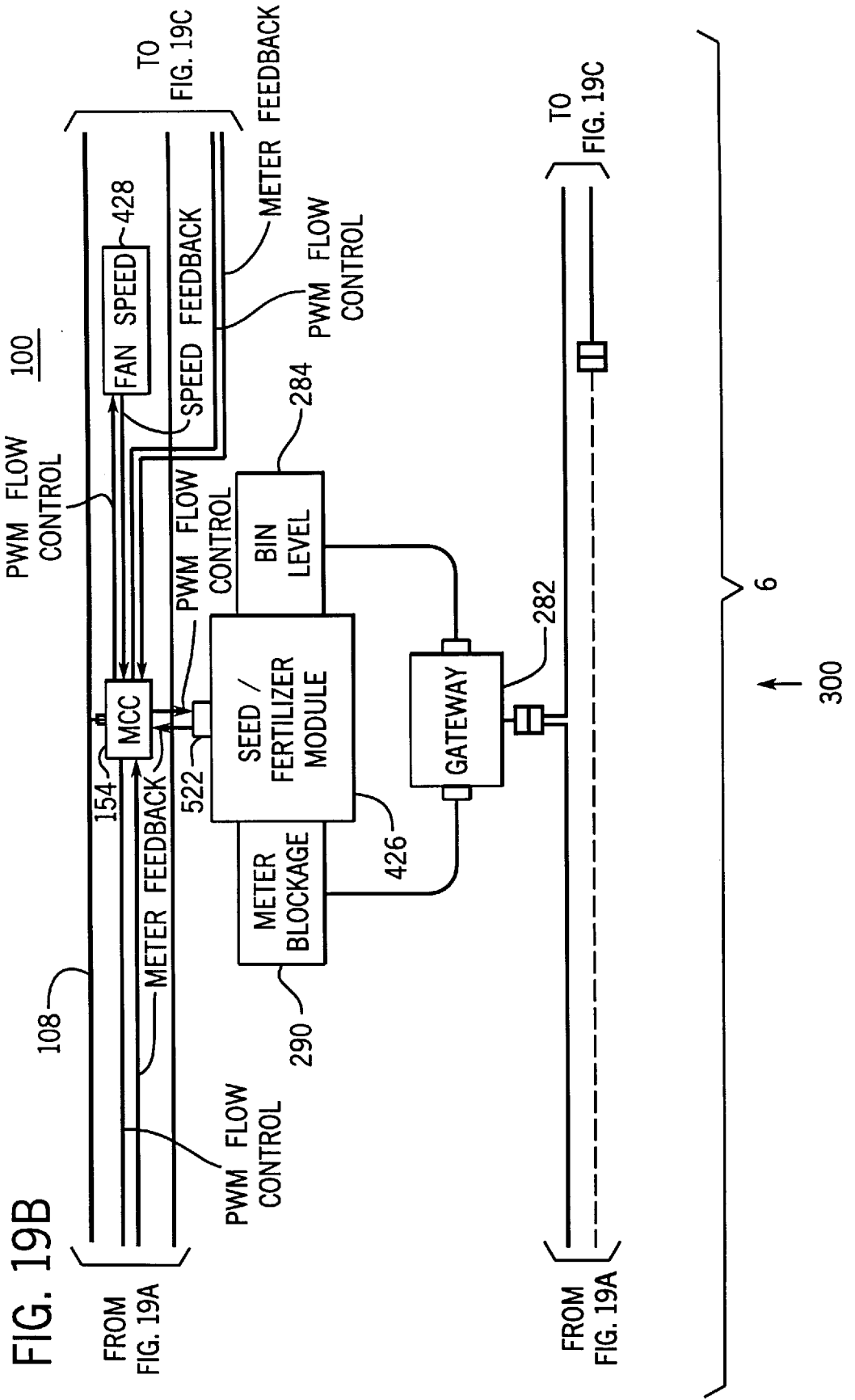

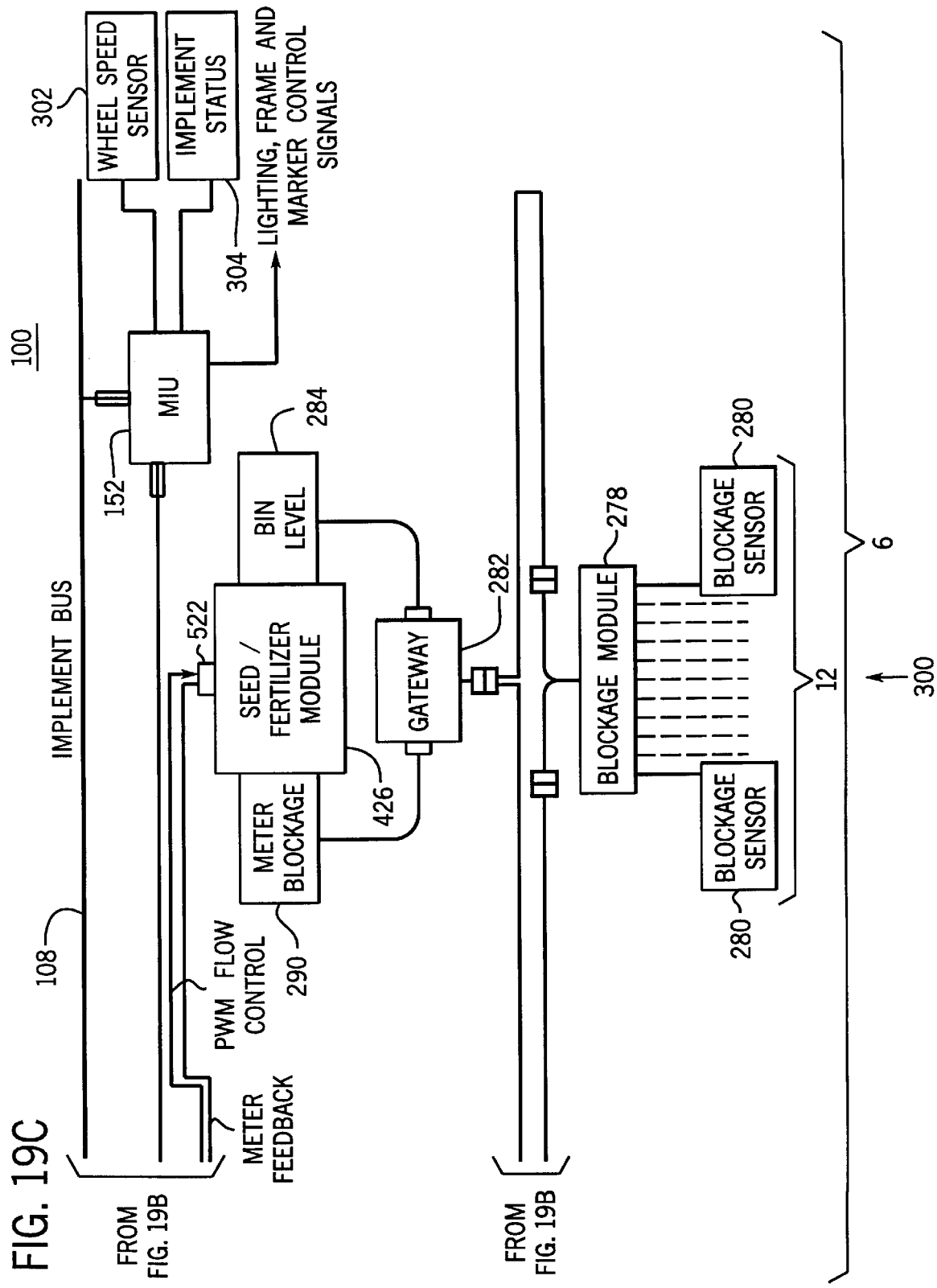

5,924,371

GLOBAL CONTROLLER AND DISTRIBUTED LOCAL CONTROLLER(S) FOR AN AGRICULTURAL IMPLEMENT

FIELD OF THE INVENTION

The present invention generally relates to control systems for agricultural implements. In particular, the invention relates to a control system for an implement (e.g., planter, conventional drill, air drill, fertilizer spreader) including a global controller for controlling global implement functions (e.g., frame lighting, frame position control, marker position control) and at least one distributed local controller for controlling local implement functions (e.g., product metering).

BACKGROUND OF THE INVENTION

Implements such as planters, conventional drills and air drills are used to plant seed in agricultural fields. Planting implements typically include a frame with one or more sections. Each section supports multiple row units configured to apply seeds to a field as the implement is pulled by a vehicle (e.g., wheeled or tracked tractor). Seeds are stored in one or more seed bins located on or pulled behind the implement. Planters and drills often include systems configured to apply granular or liquid fertilizer, insecticide or herbicide.

Planters include meters configured to dispense or meter individual seeds to row units. Drills use fluted rolls to meter a mass or volume of seed. Metering and placement accuracy is typically higher for planters than drills. Seeds of crop (e.g., corn) requiring relatively accurate metering and placement for efficient growth are typically planted using planters, and seeds of crop which grow efficiently in more varied environments (e.g., oats; wheat) are planted by less accurate and expensive drills.

Many planters and drills are made by Case Corp., the assignee of this invention. For example, the 955 Series EARLY RISER CYCLO AIRS Planters include central-fill seed bins for storing seed, pressurized air metering systems for metering seed, and air distribution systems for delivering seeds to row units. Planters in this series plant different numbers of rows at different row widths. For example, a 12/23 solid row crop (SRC) cyclo planter plants 23 narrow rows or 12 wide rows when every other row unit is locked up. Case Corp. also makes the 900 Series EARLY RISER Plate Planters. Conventional drills include 5300, 5400 and 5500 grain drills which include different numbers of openers, opener spacings and seeding widths. For example, a 5500 Soybean Special Grain Drill has 24 openers, 5 inch spacings and a 30 foot width. A family of Concord air drills is available from Case Corp.

Under conventional agricultural practices, fields are treated (e.g., planted) as having uniform parameters. However, crop production may be optimized by taking into account spatial variations often existing within fields. By varying inputs applied to a field according to local conditions within the field, the yield as a function of the inputs applied can be optimized while environmental damage is prevented or minimized. Farming inputs which have been applied according to local conditions include herbicides, insecticides and fertilizers. The practice of farming according to local field conditions has been called precision, site-specific or prescription farming.

To fully realize the benefits of precision farming, planting implements are needed which can monitor rates at which farming inputs are applied and which can control the rates of application on a site-specific basis. The control requirements for such planting implements would be more sophisticated than for conventional implements. Thus, it would be desirable to have planting implements (e.g., planters, conventional or air drills) equipped with control systems for monitoring rates at which inputs are applied to a field by row units, and for controlling the rates at which metering devices dispense the inputs.

Planting implements further include "global" output devices which perform global implement functions such as frame lighting control, frame position control and marker position control. These global functions are performed for the whole implement, rather than for each section or row unit. Frame lights are controlled to warn following motorists when the implement turns. The frame of the implement is controlled to raise and lower the implement, and to fold and unfold the frame wings. Markers attached to either side of the implement are raised and lowered to indicate the centerline of the next pass through a field.

The current standard for implement frame lighting includes tail lamp, right turn and left turn signal lamps controlled by a three-signal vehicle connector. However, implements will be required to meet an enhanced lighting standard (i.e., ASAE S279) which will include additional enhanced left and right turn signal lamps. The new lamps will enhance the turn warning signals. The enhanced lamps will perform the same functions as the current left and right turn lamps except the opposite turn signal lamp will not light steadily when making a turn. Additionally, neither lamp will flash during a regular transport mode. To accommodate the use of implements compatible with the new standard with today's vehicles, it would be desirable to provide a control system which receives standard lighting signals, converts them to enhanced lighting signals, and uses the enhanced lighting signals to control the enhanced lamps.

It would further be desirable to provide a control system for an implement which provides a central control console for the operator. This console, which would be located at the operator station (e.g., in the cab), would generate global command signals for the global implement functions and rate commands for local product metering devices mounted on each section of the implement. To reduce wiring requirements, it would also be desirable to provide an implement bus running between the cab and the implement for sending global and local commands to the implement, and for receiving monitored feedback signals.

The number of global output devices for performing global implement functions will generally be known since these functions are performed for the whole implement. Thus, the control requirements for a global control unit will be known. An implement, however, can include one, two, three or more sections, with each section having one or more product metering devices. It would be difficult to ascertain the control requirements for a single local implement controller. Thus, it would be desirable to provide a control system for a planting implement wherein one global controller controls global functions, while a plurality of distributed local controllers control the product application rates for the plurality of sections.

The movement from conventional to precision farming practices will take significant time as farmers evaluate the technology, learn to use it, study its economic and environmental costs and benefits, and upgrade equipment. To help make the transition, it would be desirable to provide an implement with a modular control system which can be upgraded over time by adding controllers with added functionality. The initial control system would provide monitoring and global control functions, with application rates being controlled conventionally. Such a control system could then be upgraded to provide variable-rate control capabilities. These capabilities would be controlled manually, or automatically based upon the position of the implement and geo-referenced maps.

SUMMARY OF THE INVENTION

One embodiment of the invention provides a control system for an agricultural implement including a global output device and a plurality of sections. The global output device performs a global function in response to global control signals. Each section includes a local metering device for applying a product to rows of a field in response to local control signals. The control system includes a source of commands to generate global commands for the global function and product rate commands for each product metering device, a global controller to receive the global commands, generate the global control signals from the global commands, and apply the global control signals to the global output device, and local controllers corresponding to the sections. Each local controller receives the product rate commands for the local product metering device, generates the local control signals for the local product metering device from the product rate commands, and applies the local control signals to the local product metering device.

Another embodiment of the invention provides a control system for an implement coupled to a work vehicle having an operator station such as a cab. The implement includes a global output device for performing a global implement function in response to global control signals and also includes sections. A local product metering device for each section applies a product to a row of a field in response to local control signals. The control system includes a data bus running between the operator station and implement, and an operator interface located at the operator station for generating global commands on the bus for the global function and product rate commands on the bus for the local product metering devices. A global controller, supported by the implement, receives the global commands and generates the global control signals therefrom. Local controllers, located on each section, receive the product rate commands for the local product metering device and generate the local control signals for the local product metering device therefrom.

Another embodiment of the invention provides an implement coupled to an agricultural vehicle including a cab, an operator interface and a data bus running between the operator interface and the implement. The operator interface generates global commands and local application rate commands on the bus. The implement frame includes sections, each section including a metering device for applying a product to rows of a field in response to local control signals. A global output device on the frame performs a global function in response to global control signals. A global controller receives the global commands from the bus and generates the global control signals therefrom. Local controllers receive the local application rate commands from the bus for the metering device for one section and generate the local control signals for the local metering device therefrom.

BRIEF DESCRIPTION OF THE DRAWINGS

The invention will become more fully understood from the following detailed description, taken in conjunction with the accompanying drawings, wherein like reference numerals refer to like parts, in which:

FIG. 1 is a top view of a planting implement (e.g., a 12/23 solid row crop (SRC) cyclo planter);

FIGS. 3A–3B depict a block diagram of the control system for an agricultural work vehicle and planting implement which includes a vehicle data bus and an implement data bus;

FIGS. 9A–9B depict a block diagram of a control system for a conventional drill (e.g., a soybean special grain drill) including an MIU for monitoring sensors and controlling global functions;

FIGS. 11A–11C depict a block diagram of a control system for an air drill (e.g., Concord air drill) including an MIU for monitoring sensors and controlling global functions;

FIG. 12 is an electrical block diagram showing the MIU and the interfaces between the MIU and the lighting, frame and marker systems of the drill shown in FIG. 11;

FIGS. 14A–14C depict a block diagram of a control system for a planter as in FIG. 6 which further includes local MCCs to control the seed rates of each section;

FIGS. 17A–17B depict a block diagram of a control system for a conventional drill as in FIG. 9 which further includes local MCCs to control the seed rates of each section;

FIGS. 19A–19C depict a block diagram of a control system for an air drill as in FIG. 11 (e.g., Concord air drill) further including a local MCC to control the seed rates of the implement sections.

DETAILED DESCRIPTION OF THE PREFERRED EMBODIMENTS

Figure 2A:
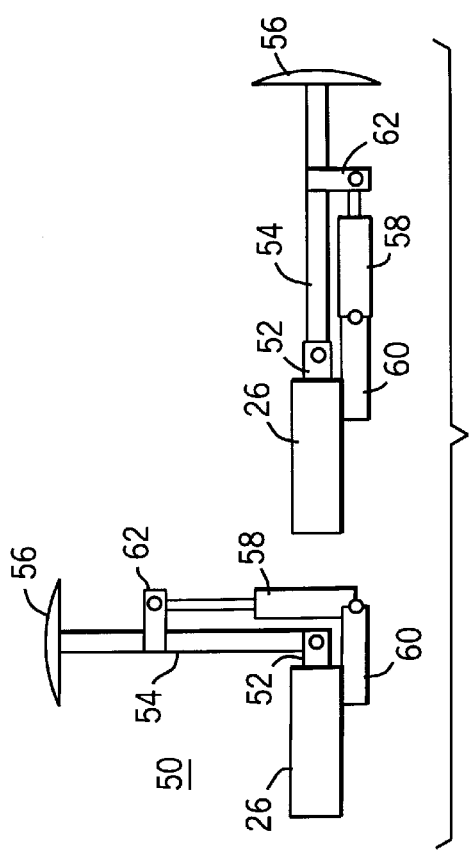
FIG. 2a shows single-stage markers in their fully folded and unfolded states.

Referring to FIG. 1, a planting implement 10 (e.g., 12/23 SRC cyclo planter) is shown. Implement 10 includes a frame 12, row units 14 mounted beneath frame 12, and seed modules 16 supported on frame 12. Frame 12 includes a middle section 18, two wing sections 20 mounted for rotation on either side of section 18, and a drawbar 22 extending forward from section 18. Wing sections 20 are horizontally rotatable in towards drawbar 22 to decrease implement width for transport. An eye 24 extends from drawbar 22 for connection to a vehicle. There are 23 row units 14 configured to plant seed in 23 rows of a field when all 23 row units 14 are down, or in 12 rows when every other row unit 14 is locked up. Each seed module 16 meters seeds for one section. The sections include 8, 8 and 7 row units 14, respectively. The metered seeds travel through seed tubes (not shown) to row units 14. Implement 10 also supports bins 25 storing other products (e.g., fertilizer) along with metering devices therefore.

Figure 2B:
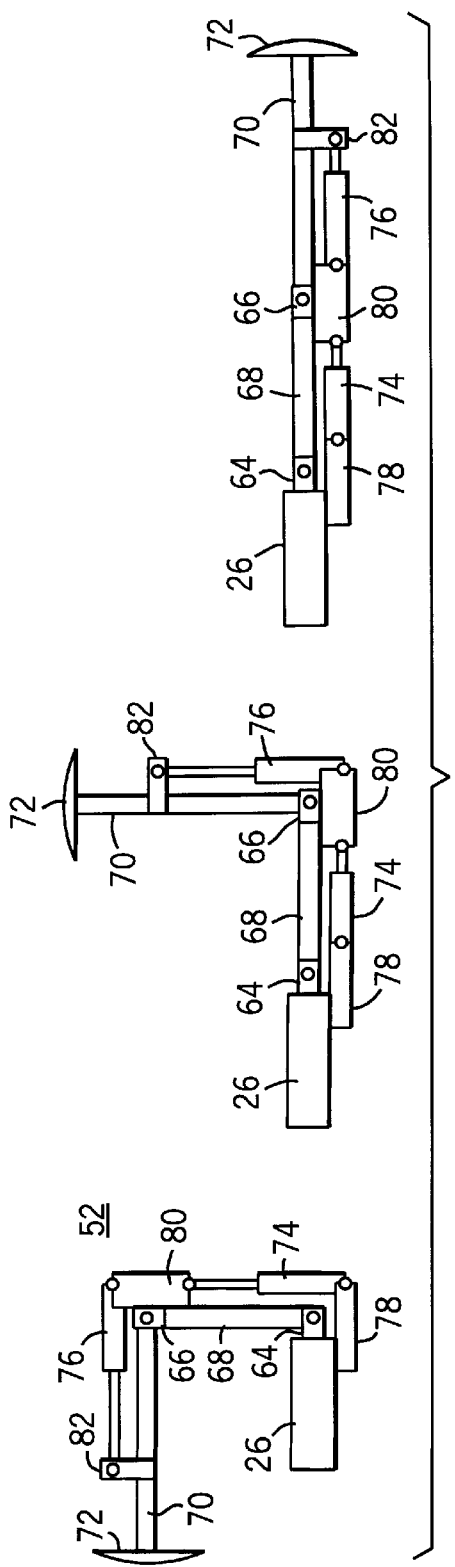
FIG. 2b shows dual-stage markers in their fully, partially and unfolded states.

Referring to FIGS. 1 and 2, markers attached to ends 26 of wing sections 20 on both sides of frame 12 are used to mark the centerline of the next pass through a field. A particular implement may use single-stage markers 50 (FIG. 2a). Other implements, such as the planter, use dual-stage markers 52 (FIG. 2b). FIG. 2a shows single stage marker 50 in its fully folded and unfolded states. Marker 50 includes a pivot assembly 52 mounted to end 26 of wing section 20 and a marker rod 54 connected between assembly 52 and a disk 56. Disk 56 marks the field when marker 50 is unfolded. Marker 50 is actuated by an outer cylinder assembly 58 pivotally coupled between a support member 60 extending from end 26 and a bracket 62 attached to rod 54. Marker 50 is folded when cylinder assembly 58 is extended and unfolded when assembly 58 is retracted.

Referring to FIG. 2b, dual-stage marker 52 is shown in its fully, partially, and unfolded states. Marker 52 includes a first pivot assembly 64 mounted to end 26 of wing section 20, a second pivot assembly 66, and a first marker rod 68 connected between assemblies 64 and 66. A second marker rod 70 is connected between assembly 66 and a marker disk 72. Disk 72 marks the field when marker 52 is unfolded. Marker 52 is actuated by inner and outer cylinder assemblies 74 and 76. Assembly 74 is pivotally coupled between a first support member 78 extending from end 26 and second support member 80 attached to assembly 66. Assembly 76 is pivotally coupled between member 80 and a bracket 82 attached to rod 70. Marker 52 is folded when assemblies 74 and 76 are extended, partially folded with assembly 74 retracted and assembly 76 extended, and unfolded with assemblies 74 and 76 retracted.

Figure 3B:
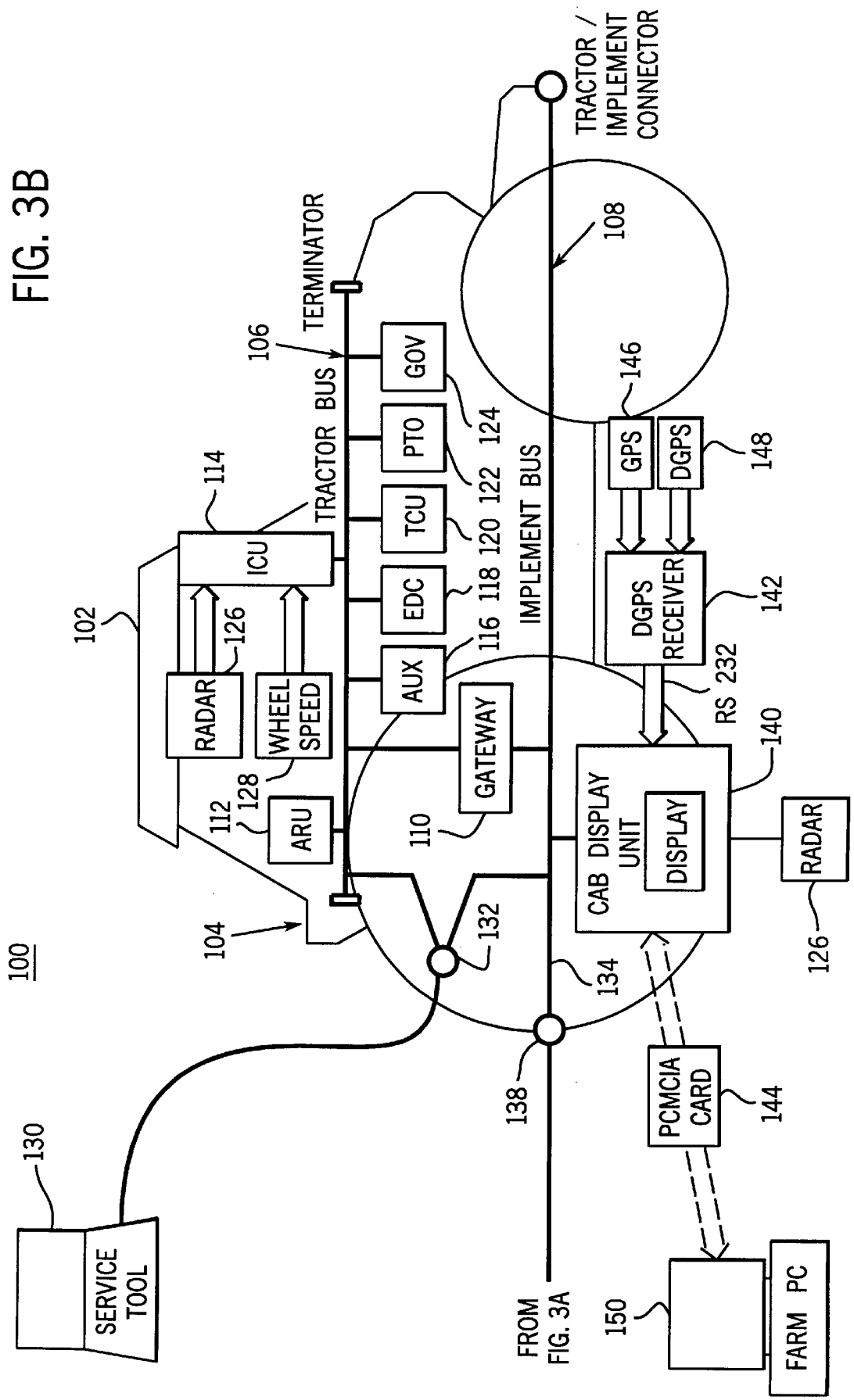

Referring to FIGS. 3A–3B, a control system 100 is shown for an agricultural vehicle 102 (e.g., a tractor) pulling implement 10 (e.g., planter, conventional or air drill). System 100 includes electronic control units (ECUs) in communication with each other across a vehicle data bus 104. Bus 104 includes a tractor bus segment 106 to pass data throughout vehicle 102, and an implement bus segment 108 to communicate between vehicle 102 and implement 10. Bidirectional data passes between busses 106 and 108 via a network interconnection ECU 110 (e.g., a gateway). Bus 104 preferably conforms to the "Recommended Practice for a Serial Control and Communications Vehicle Network" (SAE J-1939) which uses Controller Area Network (CAN) protocol for low-layer communications. ECU 110 performs network functions as described in the Network Layer specification of J-1939 by acting as a repeater for forwarding messages between segments 106 and 108, a bridge for filtering out messages not needed by the receiving segment, a message router for remapping addresses and a gateway to repackage messages for increased efficiency. Other bus formats, however, may also be used and ECU 110 may perform all or only a subs et of the above-listed network functions.

Other ECUs coupled to tractor bus 106 include an armrest control unit (ARU) 112, instrument cluster unit (ICU) 114, auxiliary valve control unit (AUX) 116, electronic draft control unit (EDC) 118, transmission control unit (TCU) 120, power take-off control unit (PTO) 122, and engine governor control unit (GOV) 124. ICU 114 receives signals from a true ground speed sensor 126 (e.g., a radar) mounted to the body of vehicle 102. Ground speed sensor 126 (e.g., a radar) may also be in direct communication with a cab-mounted display unit (CDU) 140. A service tool 130 can be coupled to busses 106 and 108 via a diagnostic connector 132 for use during diagnostics and maintenance.

The ECUs coupled to tractor bus 106 are illustrative and other control units such as a performance monitor control unit or steering control unit could also be connected to bus 106. Further, the use of gateway 110 for communications between busses 106 and 108 allows a higher level of integration in tractors equipped with a tractor data bus. However, implement bus 108 and its associated ECUs may also be used to control implements pulled by other tractors which have no tractor data bus.

Implement bus 108 includes first and second segments 134 and 136 coupled via a connector 138 at the rear of vehicle 102. Segment 134 passes through vehicle 102 and segment 136 provides a communication pathway to implement 10. Thus, implement bus 108 reduces wiring needs between implement 10 and vehicle 102. Besides gateway ECU 110, ECUs coupled to segment 134 include cab-mounted display unit (CDU) 140. CDU 140 provides an operator interface, a serial interface (e.g., RS-232) to receive positioning signals from a DGPS receiver 142, and an interface for a memory card 144 (e.g., a PCMCIA card). Receiver 142 receives GPS and DGPS signals from antennas 146 and 148. Memory card 144 transfers geo-referenced map data (e.g., prescription and application rate maps defined by GIS or Global Information System databases) between control system 100 and an external computer 150. Prescription maps include application rate commands, and application rate maps record actual (i.e., sensed) application rates.

ECUs coupled to segment 136 of implement bus 108 are mounted to frame 12 of implement 10. These ECUs include a monitor interface unit (MIU) 152 and one or more multi-channel control units (MCCs) 154. Each implement section typically includes one "local" MCC 154 to control product application rates. MIU 152 monitors application rates of products (e.g., seeds) to rows and other parameters (e.g., bin level, ground speed, wheel speed, meter pressure) based on signals generated by monitoring sensors 156, implement status devices 158 and a wheel speed sensor 128 (e.g., inductance magnetic pickup sensor) coupled to the vehicle's wheels. MIU 152 also receives global commands from CDU 140 via bus 108, generates global control signals using the global commands, and applies the global control signals to global output devices 160 to perform global implement functions (e.g., lighting, frame, marker control). MCCs 154 receive local product application rate commands from CDU 140 based on signals generated by application sensors 161, generate local control signals for local product metering devices 162, and apply the local control signals to metering devices 162. Further, MCCs 154 may generate control signals for a variety or type switch 164 which selects the variety or type of farming inputs applied. MCCs 154 may also generate control signals for a section control switch 165 which selects which sections are enabled or disabled.

Figure 4:
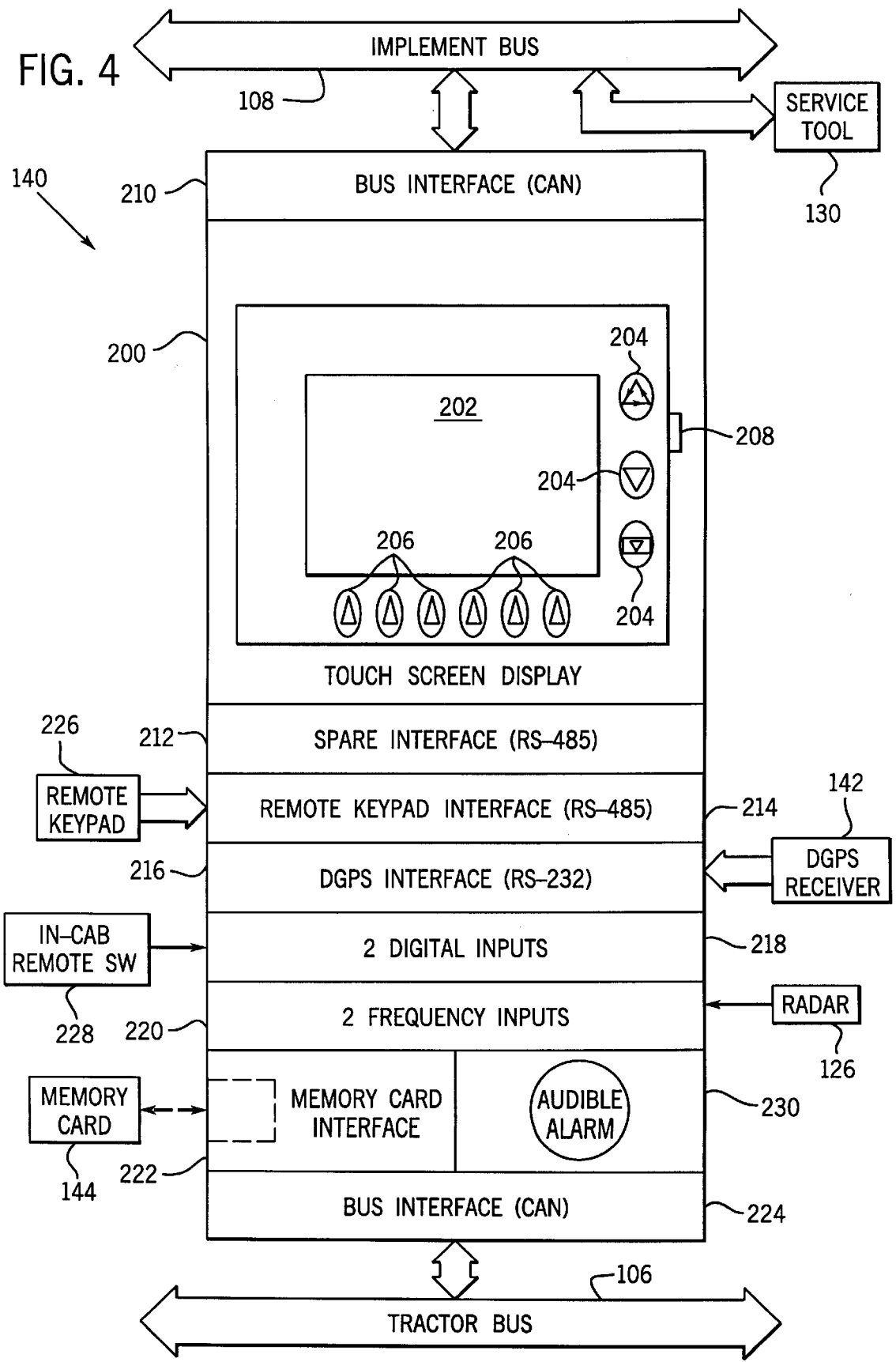
FIG. 4 is a block diagram of the cab display unit (CDU) of FIG. 3, and the interfaces between the CDU and other components of the control system.

Referring to FIG. 4, CDU 140 is an ECU mounted in the cab of vehicle 102. CDU 140 includes a display unit 200 including a touch screen 202 (e.g., a TFT 10.4" color display with digital touch screen), system touchscreen switches 204, reconfigurable touchscreen switches 206 and system reset switch 208. A ½ VGA monochrome DMTN display with LED backlighting could also be used. CDU 140 has interfaces 210–224 for implement bus 108, a remote keypad 226, DGPS receiver 142, digital inputs (e.g., an in-cab remote switch 228), frequency inputs such as radar 126, memory card 144 and tractor bus 106. CDU 140 includes an audible alarm 230. A processor (e.g., ARM LH74610 RISC processor) coupled to memory circuits (e.g., RAM, EEPROM, Flash EPROM) provides control for CDU 140.

Control system 100 can control different planting implement applications. An operator uses touch screen 202 to navigate and perform common functions within each application. System touchscreen switches 204 include a MODE switch for toggling between applications, a CALIBRATE switch for performing configuration and calibration functions, and a UTILITY switch for performing file transfers on card 144. Touchscreen switches 206 select between items on reconfigurable menus to control the operations of control system 100. Reset switch 208 resets control system 100. Remote keypad 226, mounted via a cable near the operator when CDU 140 is mounted elsewhere in the cab, duplicates touchscreen switches 206. In-cab remote switch 228 allows the operator to remotely start and stop product metering. Alarm 230 is used to alert the operator to error and alarm conditions.

Both global and local operations of implement 10 are controlled by actuations of touchscreen switches 204–206. The global functions include lighting control (e.g., turning on and off lights attached to frame 12), frame control (e.g., raising and lowering frame 12; folding and unfolding wings 20) and marker control (e.g., alternately raising and lowering markers 50 or 52 on both sides of implement 10 to mark the centerline of the next pass). Actuations needed to control the global functions depend on the particular implement. When switch actuations relate to lighting, frame or marker control, CDU 140 generates global command signals which are communicated to MIU 152 via bus 108 for controlling global output devices 160.

The local implement functions include variable-rate application of products to a field. Touchscreen switches 204–206 are actuated to control the rates in a manual or an automatic mode. In manual mode, the actuations set, increase or decrease the desired application rates for one or more products applied by each section. In automatic mode, the actuations select between one or more prescription maps stored on card 144. The maps include geo-referenced data representing desired application rates of one or more products at positions throughout a field. Desired rates are determined, for example, offline using computer 150. The selected maps are indexed using positioning signals received by DGPS receiver 142 to determine the desired application rates which are then used to generate local product rate commands transmitted to MCCs 154.

Figure 5:
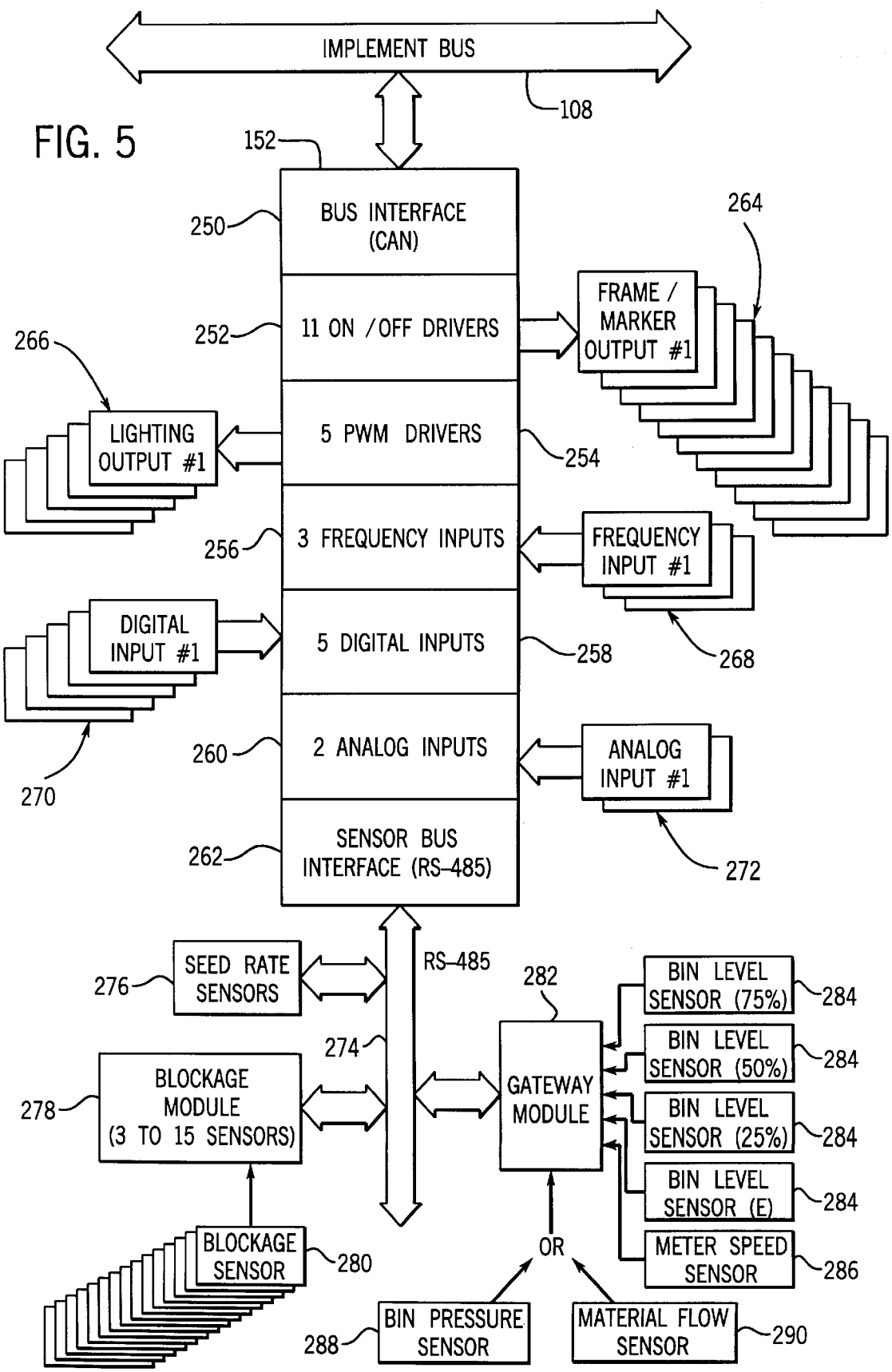
FIG. 5 is a block diagram of the monitor interface unit (MIU) of FIG. 3, and the interfaces between the MIU and other components of the control system.

Referring to FIG. 5, MIU 152 is an ECU supported on frame 12 which includes interfaces 250–262 for implement bus 108, frame/marker outputs 264 (e.g., markers 50, 52; wings 20), lighting outputs 266, frequency inputs 268, digital inputs 270, analog inputs 272 and sensor bus 274. Interfaces 250–262 include spares such that MIU 152 can be used in multiple applications. MIU 152 is connected in control system 100 as shown below. Sensor bus 274 is coupled to seed rate sensors 276, a blockage module 278 coupled to blockage sensors 280, and a gateway module 282. Optical seed rate sensors 276 detect seeds passing through seed tubes to row units 14. Module 282 receives signals from optical bin level sensors 284, a meter speed sensor 286, and bin pressure or material flow sensor 288 or 290. Signals from bin level sensors 284 indicate when the bins of seed modules 16 are 75% full, 50% full, 25% full, and Empty. Sensor bus 274 is preferably an RS-485 network as described in U.S. Pat. No. 5,635,911, herein incorporated by reference. MIU 152 is controlled by a processor 314 (FIG. 7; e.g., an AN80C196CB processor) coupled to memory (e.g., RAM, EEPROM, Flash EPROM).

Control system 100 is a modular application control system which can be upgraded with additional controllers for expanded functionality. Initially, control system 100 includes CDU 140, implement bus 108 and MIU 152 which provide monitoring and global control functions. In the initial system, product application rates are controlled conventionally (e.g., by driving product metering devices using gears coupled to the implement wheels). FIGS. 6A–12 show control system 100 in embodiments which provide for monitoring and global control functions for implements. Control system 100, however, can later be upgraded with MCCs 154 to provide variable-rate control. FIGS. 14A–20 show upgraded control system 100 for the same implements.

Figure 6A:
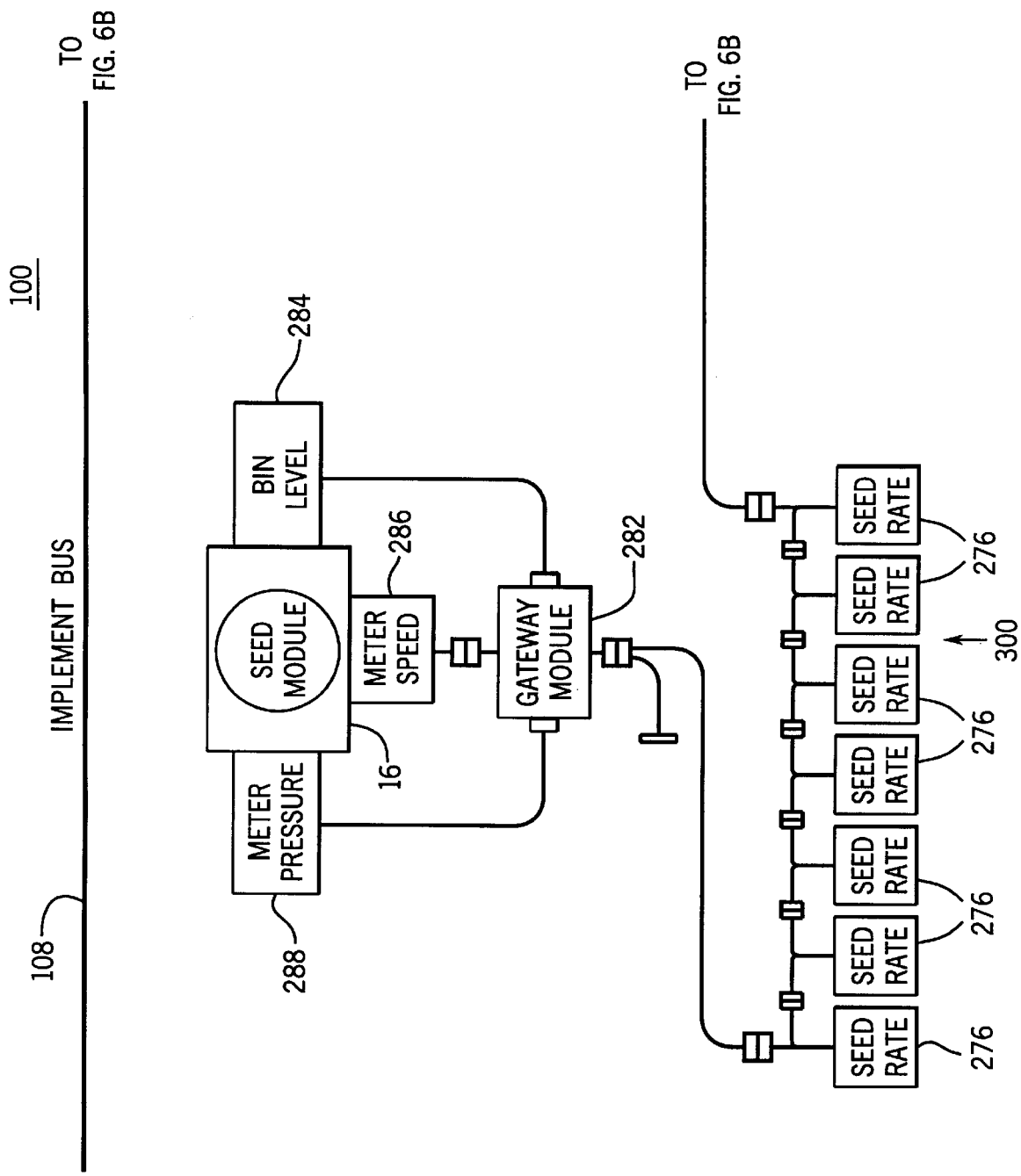
FIGS. 6A–6B depict a block diagram of a control system for a planter (e.g., 12/23 SRC cyclo planter) including an MIU for monitoring sensors and controlling global functions.
Figure 6B:
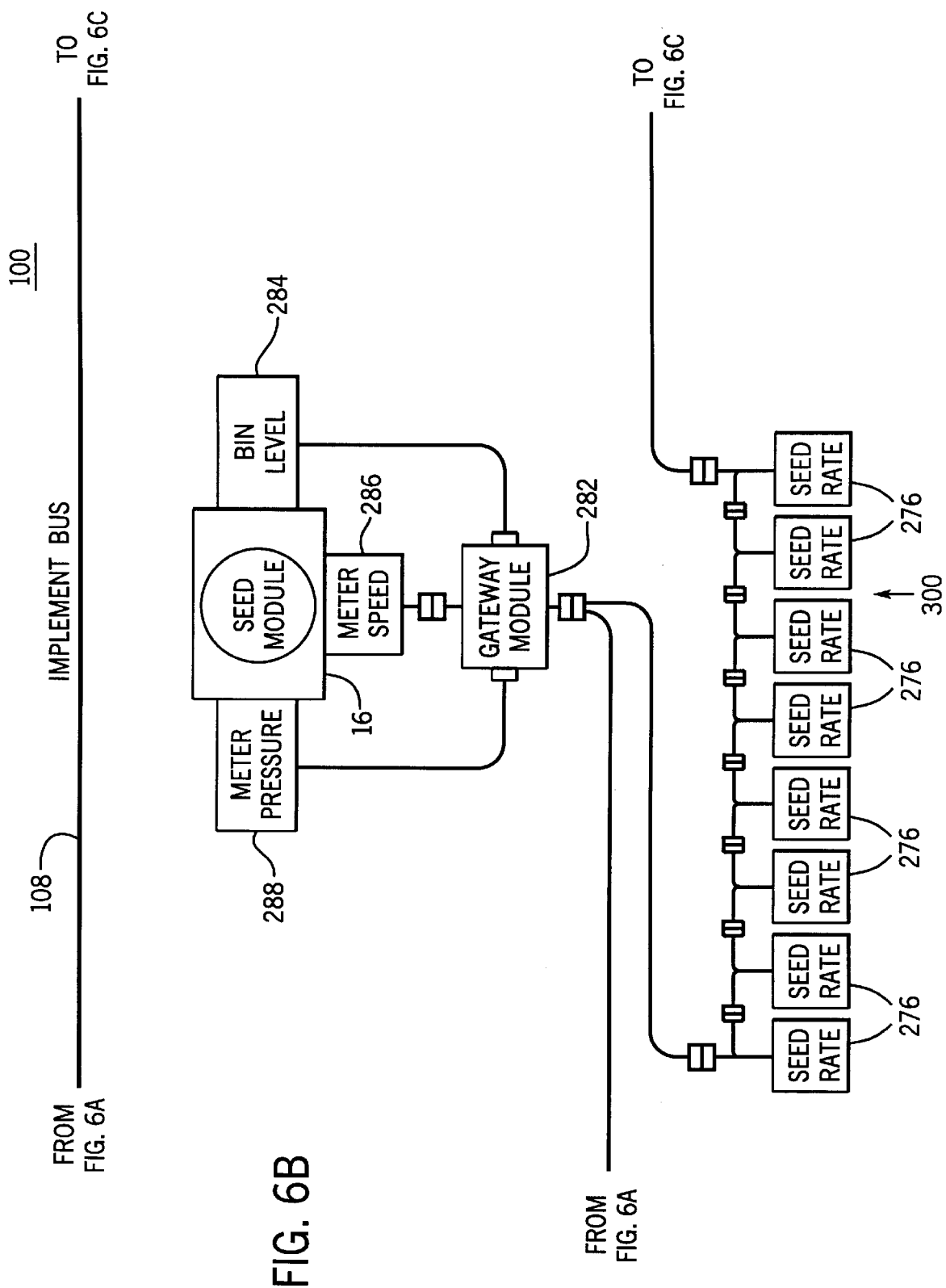
Figure 6C:
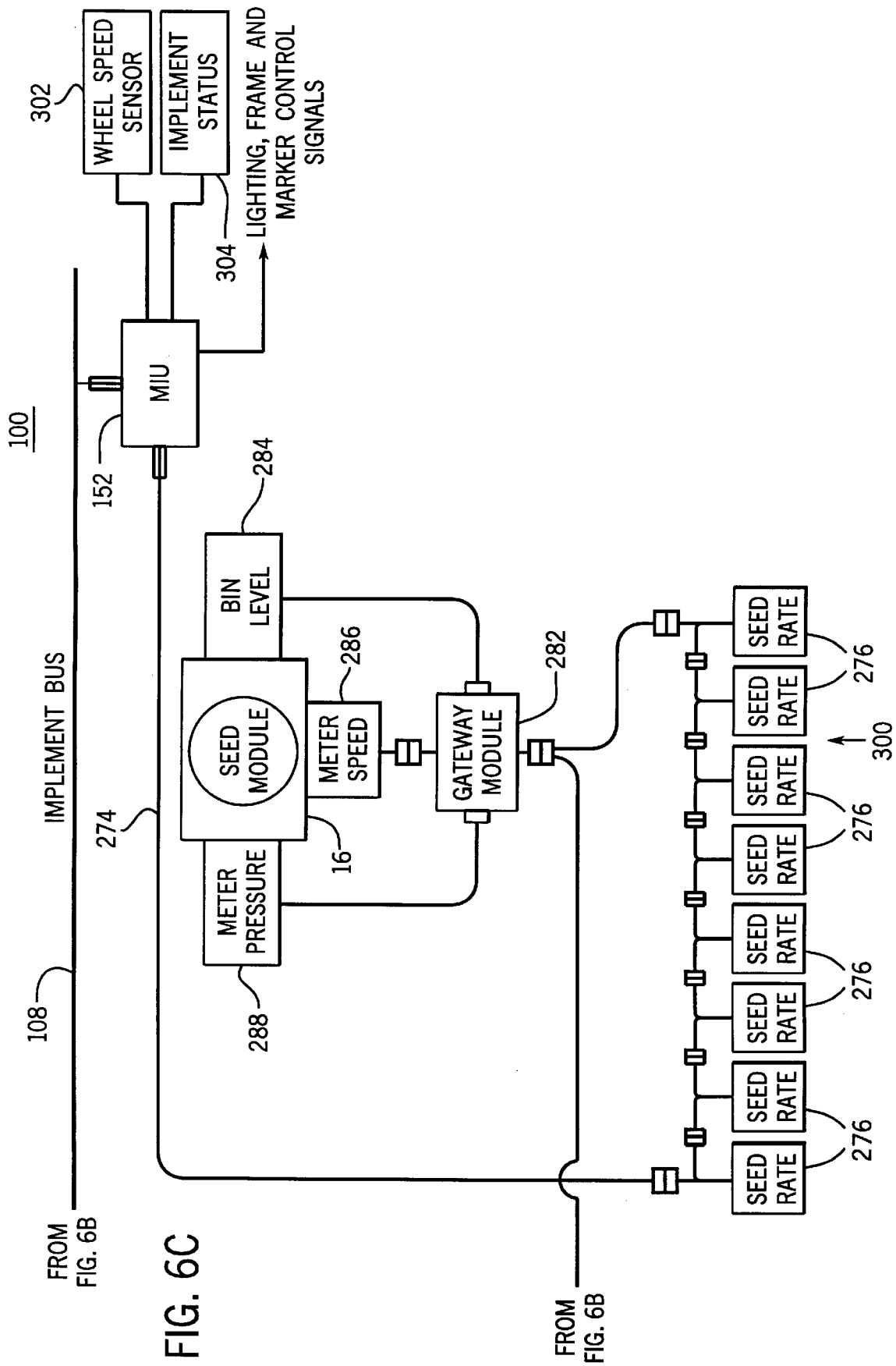

Referring to FIGS. 6A–6C, control system 100 controls a 12/23 SRC cyclo planter implement 10 which includes three sections 300, each supporting multiple (e.g., 8, 8 and 7) row units 14 configured to apply seeds to a field. Seeds are metered by a seed module 16 on each section 300. MIU 152 receives global command signals via bus 108 from CDU 140, and sends back monitored data. MIU 152 receives speed signals used to calculate seeding data (e.g., area seeded) from a sensor 302 coupled to the planter wheels. MIU 152 receives signals indicating whether implement 10 is up or down from a status sensor 304. The application of products is disabled when implement 10 is raised.

Sensor bus 274 is connected to a seed rate sensor 276 associated with each row unit 14. MIU 152 monitors seed application rates using signals received from seed rate sensors 276, and sends seed rate data to CDU 140 via bus 108. Bus 274 is coupled to a gateway module 282 for each section 300 which monitors the status of each seed module 16 using signals received from bin level sensors 284, meter speed sensor 286, and bin pressure sensor 288. MIU 152 transmits meter status to CDU 140. Connectors separate MIU 152, sensors 276 and gateway modules 282.

Figure 7:
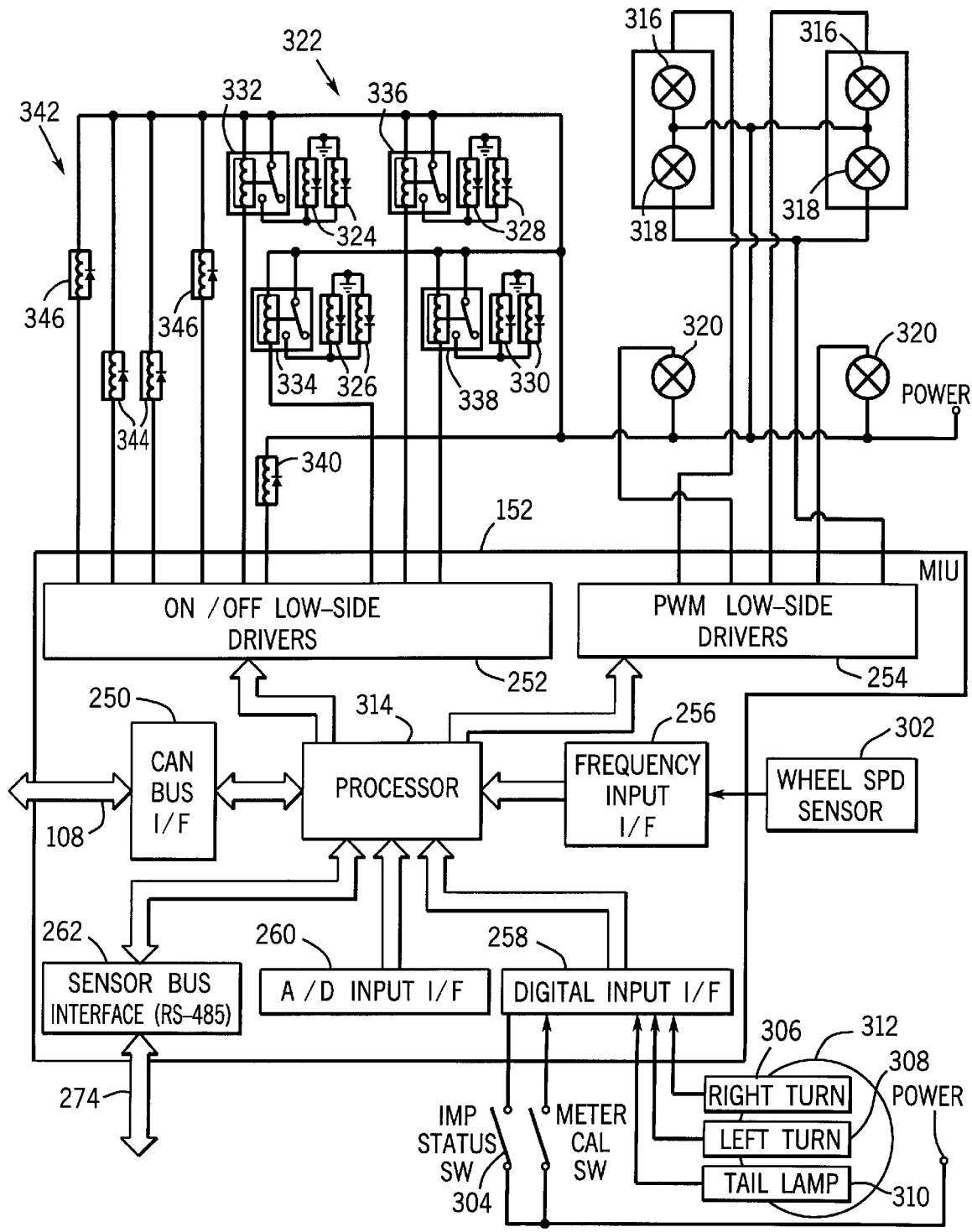
FIG. 7 is an electrical block diagram showing the MIU and the interfaces between the MIU and the lighting, frame and marker systems of the planter in FIG. 6.

Referring to FIG. 7, MIU 152 controls the planter's lighting, frame and marker systems. The lighting system commands include right turn, left turn, and tail lamp signals received on conductors 306–310 from a connector 312 at the rear of vehicle 102. Processor 314 reads the signals on conductors 306–310, converts these standard signals to enhanced lighting commands based on the ASAE S279 standard, and applies these commands to drivers 254 to generate enhanced control signals applied to left and right enhanced signal lamps including turn/flash lamps 316, tail lamps 318, and enhanced turn lamps 320. Lamps 316–320 enhance the turn signals warning motorists that vehicle 102 and implement 10 are turning. In contrast to current turn signal lamps, neither of the enhanced lamps will flash when implement 10 is in transport mode only. Additionally, the opposite turn signal lamp will not light steadily when making a turn. Thus, the lighting system of MIU 152 allows an implement which is compatible with the enhanced lighting standard to be connected directly to connector 312 of existing tractors.

Commands for the frame control system are received by processor 314 from CDU 140 via bus 108. Based on the commands, processor 314 commands drivers 252 to generate frame control signals applied to a solenoid circuit 322. Circuit 322 includes valve coils which control the flow of hydraulic fluid to actuators which move frame members such as wings 20. The coils include left and right tuck wheel solenoids 324, raise limit solenoids 326, marker isolation solenoids 328, and slave return solenoids 330. Circuit 322 uses relay circuits 332–338 to apply power simultaneously to each pair (left and right) of solenoids 324–330. There is one fold solenoid 340. Solenoids 324–330, 340 are connected to frame actuators as shown below.

Processor 314 also receives commands for the marker control system from CDU 140 via bus 108. Based upon the commands, processor 314 commands drivers 252 to generate marker control signals applied to a marker circuit 342. Circuit 342 includes coils which control fluid applied to marker actuators. The coils include left and right inner and outer marker solenoids 344 and 346 turned on and off by grounding the low-sides, thereby selectively supplying hydraulic fluid to the marker actuators as shown below.

Figure 8:
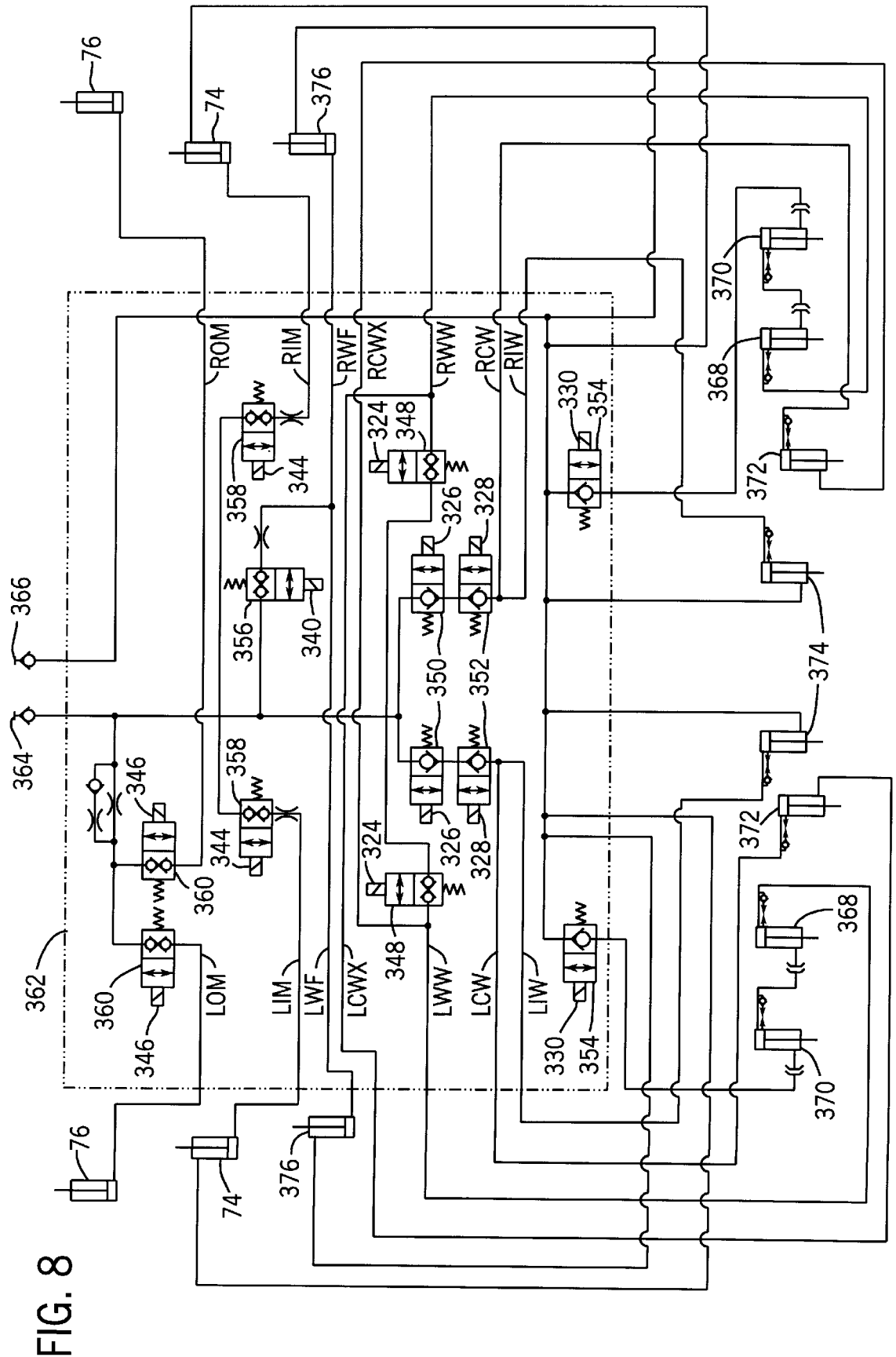
FIG. 8 is a hydraulic schematic showing interfaces between the hydraulic valves and cylinders of the frame and marker control systems of the planter in FIG. 6.

Referring to FIG. 8, frame solenoids 324–328, 340 and marker solenoids 344–346 control the flow of fluid through hydraulic cartridge valves 348–360, respectively. Valves 348–360, made by Hydraforce, check flow in both directions and are located within a composite valve block 362 having a fluid supply line 364 and return line 366. Valves made by Vickers may also be used, but two Vickers valves are needed to check the flow in both directions.

Implement 10 includes, for example, left and right wing wheels (LWW, RWW), left and right center wheels (LCW, RCW), and left and right inner wheels (LIW, RIW). Fluid from tuck valves 348 is supplied to left and right wing wheels (LWW, RWW), and is cross-linked to the right and left center wheels (RCWX, LCWX). Fluid from raise limit and marker/isolation valves 350 and 352 is supplied to the left and right center and inner wheels (LCW, RCW, LIW and RIW). Fluid from fold valve 356 is supplied to left and right fold members (LWF, RWF). Fluid from inner and outer marker valves 358 and 360 is supplied to left and right outer and inner markers (LOM, ROM, LIM, RIM).

Fluid from tuck valves 348 is received by the piston end of first slave cylinders 368, passed from the rod end of cylinders 368 to the piston of second slave cylinders 370, and returned via slave return valves 354 from the rod end of cylinders 370 to return line 366. Fluid from raise limit and marker/isolation valves 350 and 352, which check flow in opposite directions, is received by piston ends of master and assist cylinders 372 and 374. Fluid from the rod end of master cylinders 372 crosses to the piston end of opposite slave cylinders 368 and fluid from the rod end of cylinders 370 returns on line 366. Thus, master cylinders 372 are connected in master-slave arrangements to opposite slave cylinders 368 and 370 to coordinate movement of center and wing wheels LCW, RCW, LWW, RWW such that each pair of wheels extends the same amount, thereby evenly raising and lowering implement 10. Master cylinders 372, slave cylinders 368 and 370, and assist cylinders 374 form a lift circuit. Fluid from fold valve 356 is received by the piston end of fold cylinders 376 and is returned to return line 366. Fluid from marker valves 358 and 360 is received by the piston end of outer and inner marker cylinders 74 and 76, and returned from the rod end of cylinders 74 to line 366.

Thus, tuck and slave return solenoids 324 and 330 control the flow to slave cylinders 368 and 370 to tuck wing wheels LWW and RWW. Energizing solenoids 324 and 330 (while de-energizing raise limit and marker/isolation solenoids 326 and 328) causes fluid to flow from supply line 364 through tuck valves 348 to slave cylinders 368 and 370 and through slave return valves 354 to line 366. This flow extends cylinders 368 and 370 to tuck the wing wheels during transport. After tucking the wing wheels, slave return solenoids 330 are de-energized to prevent fluid loss and to prevent the wheels from sagging down.

Once implement 10 reaches a predetermined height, raise limit solenoids 326 shut off the flow to the lift circuit including cylinders 368–374 to prevent implement 10 from being raised higher. Because raise limit valves 350 check flow in only one direction, implement 10 can still be lowered while solenoids 326 remain energized.

When implement 10 is raised with markers 52 down, the weight of implement 10 causes pressure in hydraulic lines which can unexpectedly cause the markers to raise. To prevent this, marker isolation solenoids 328 are de-energized such that valves 352 check flow from the lift circuit to markers 52. Thus, the markers are prevented from being raised unexpectedly if implement 10 is raised.

Markers 52 (or 50) are controlled to indicate the centerline of the next implement pass. Marker status is displayed on display unit 200 of CDU 140. For example, an icon for each marker 52 indicates whether the marker is active or inactive. Touching the inactive marker's icon causes CDU 140 to communicate a message to MIU 152 to cause MIU 152 to advance markers 52. Markers 52 can also be advanced automatically by alternating from left to right with each raise/lower cycle of implement 10 based upon the implement status input 304. Single-stage markers 50 move to fully-folded states during transport, and alternate between fully-folded and unfolded states for field operations. Dual-stage markers 52 move to fully folded states for transport, and alternate between partially folded and unfolded states during operations.

Figure 9B:
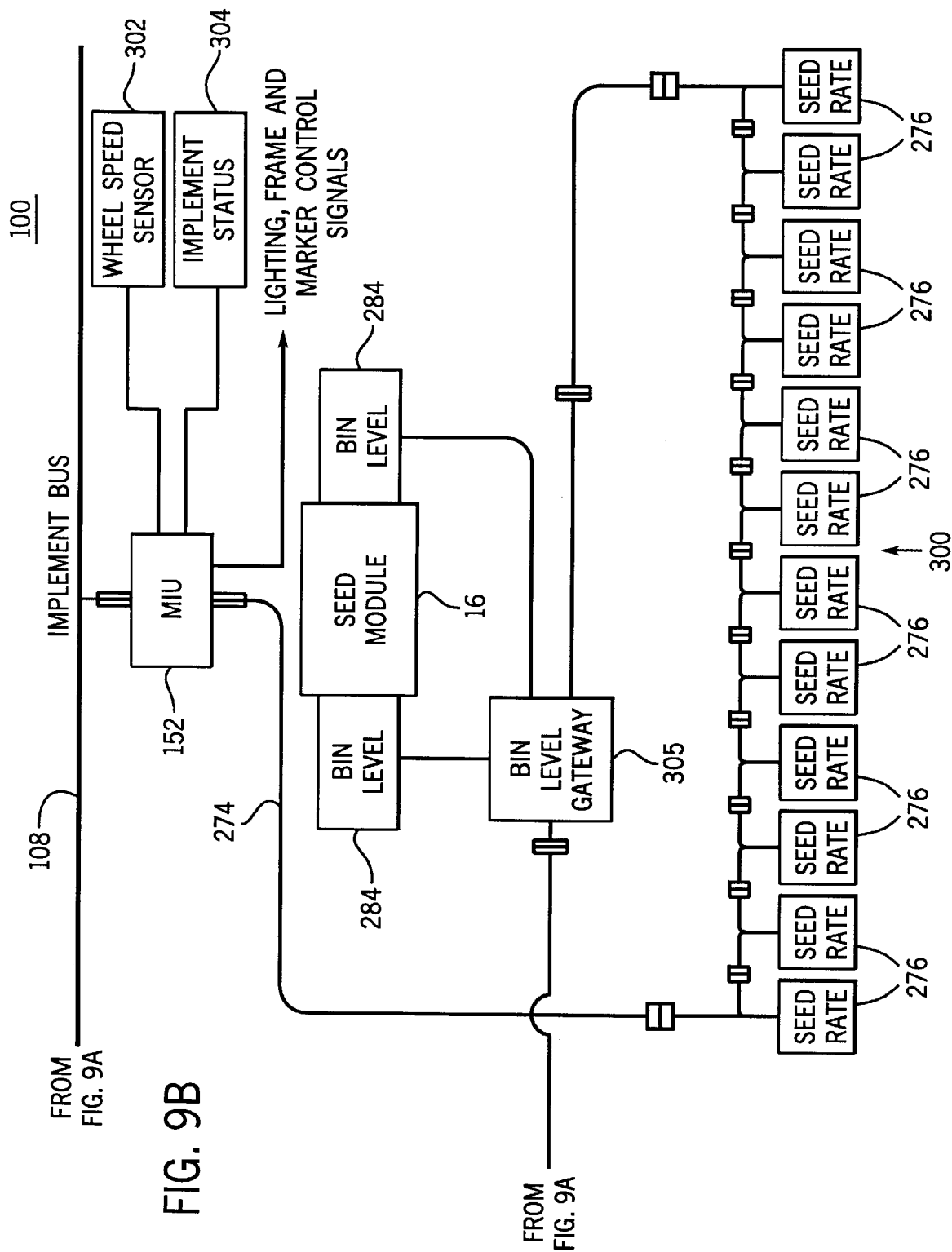

Referring to FIGS. 9A–9B, another embodiment of control system 100 is configured to control a conventional 5500 Soybean Special grain drill including two sections 300. Each section 300 supports multiple (e.g., 12 and 12) row units 14 configured to apply seeds to a field. Seeds are metered by a seed module 16 on each section 300. MIU 152 receives global command signals from CDU 140, and returns monitored data. MIU 152 receives speed signals used to calculate seeding data from sensor 302 coupled to the drill's wheels, and receives signals indicating whether implement 10 is up or down from sensor 304. Application of products is disabled when implement 10 is raised.

Sensor bus 274 connects to a seed rate sensor 276 associated with each row unit 14. MIU 152 monitors seed application rates using signals received from sensors 276, and sends seed rate data to CDU 140. Bus 274 is also coupled to bin level gateway modules 305 which monitor and receive bin level signals from bin level sensors 284 on each section 300. Bin status data is transmitted to CDU 140 and connectors separate MIU 152 and sensors 276 and 284.

Figure 10:
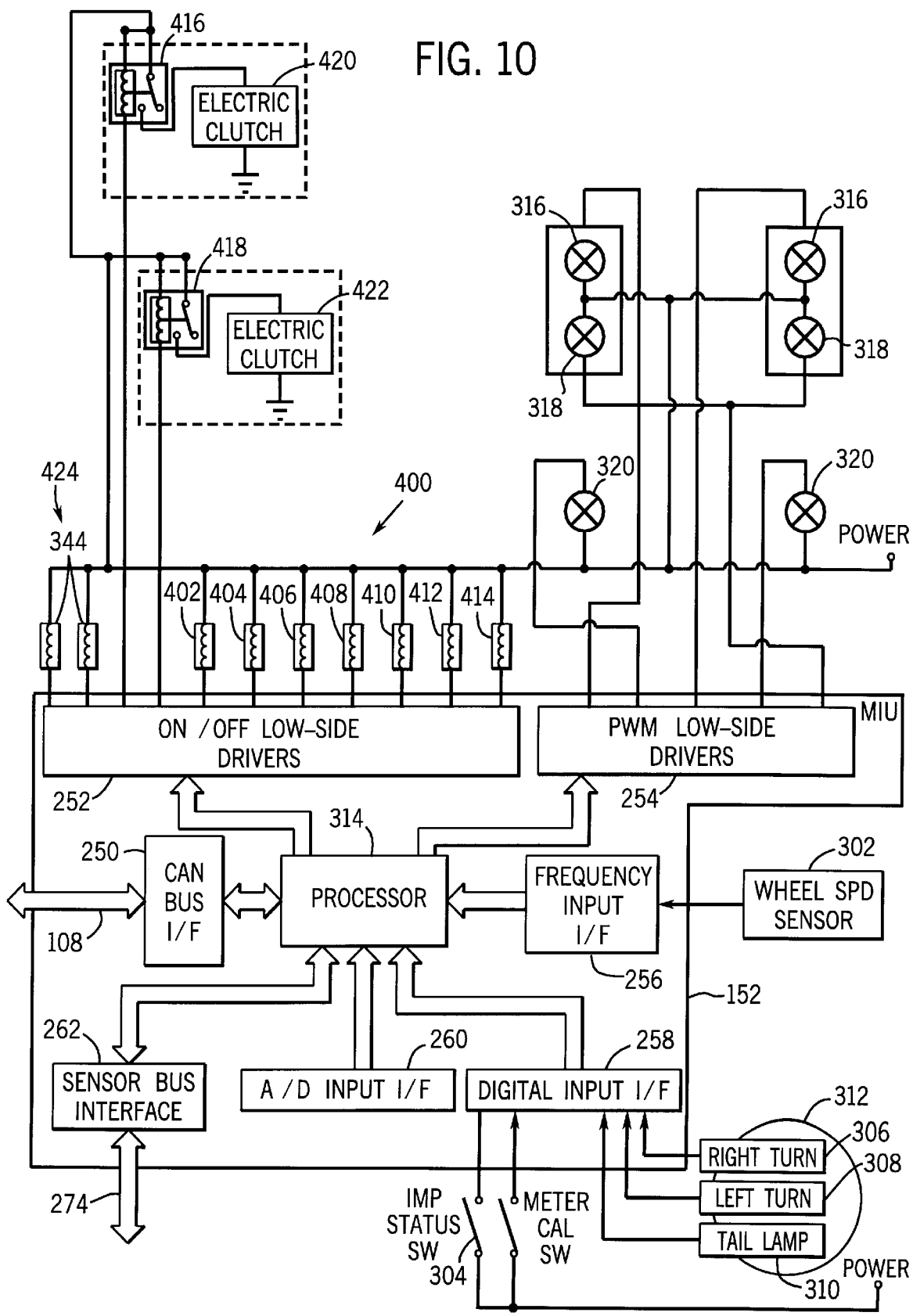
FIG. 10 is an electrical block diagram showing the MIU and the interfaces between the MIU and the lighting, frame and marker systems of the drill shown in FIG. 9.

Referring to FIG. 10, MIU 152 controls the lighting, frame and marker systems of the conventional grain drill. The lighting control system is as described in relation to FIG. 7. The frame control system includes a solenoid circuit 400 including coils controlling fluid applied to frame actuators. The coils include a fold lock solenoid (lower) 402, left-hand gauge cylinder solenoids (lower, raise) 404 and 406, right-hand gauge cylinder solenoids (raise, lower) 408 and 410, cart and gauge cylinder solenoids (lower) 412 and 414, and relays 416 and 418 for applying power to electric clutches 420 and 422 for two bins. The marker control system has a marker circuit 424 with left and right marker solenoids 344 for controlling single-stage markers 50. Frame and marker control system commands are received by MIU 152 from CDU 140, and are used to generate frame and marker control signals which are applied to circuits 400 and 424 by drivers 252.

Figure 11A:
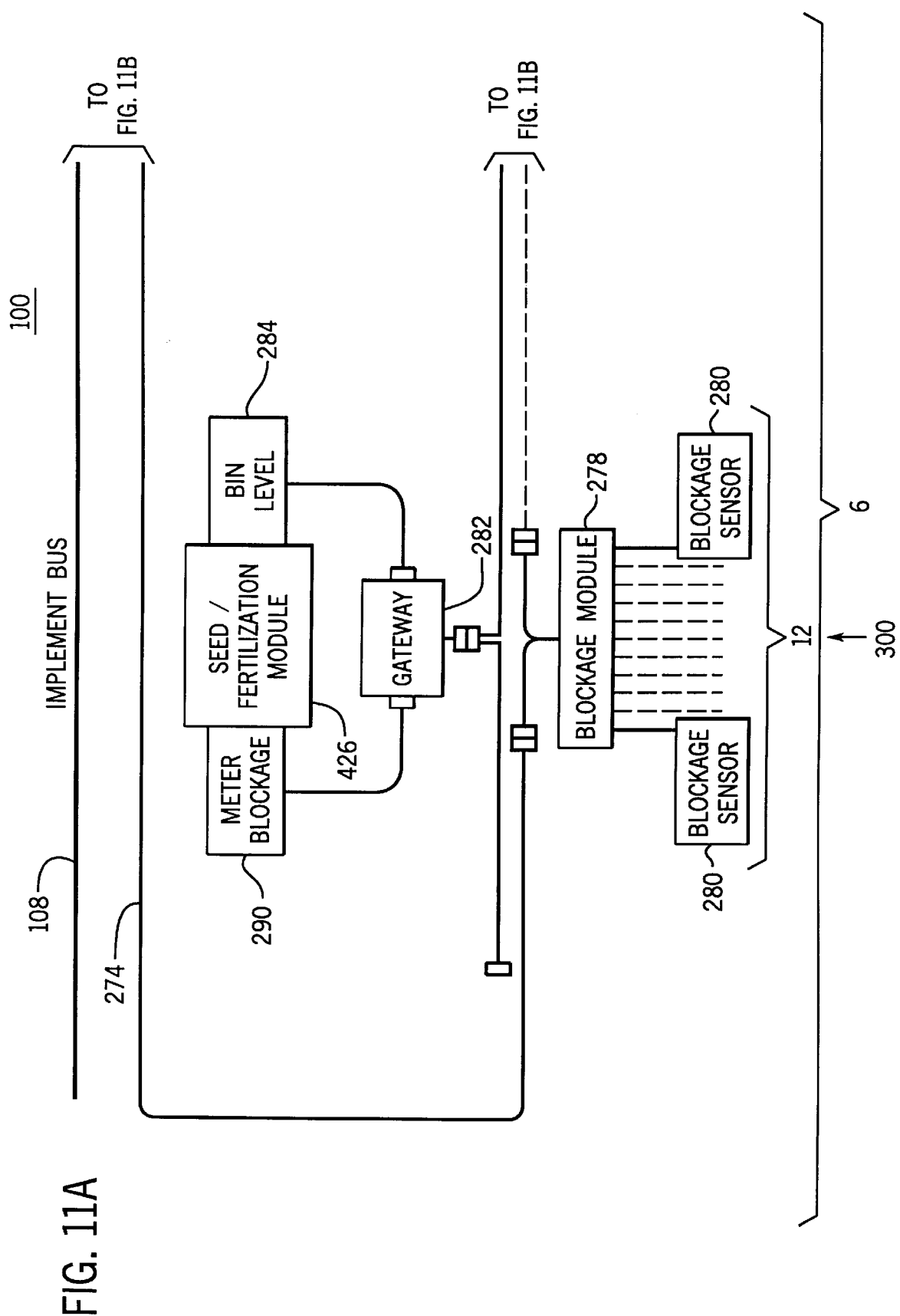

Referring to FIGS. 11A–11C, another embodiment of control system 100 is configured to control a Concord air drill including six sections 300. Each section 300 supports a blockage module 278 coupled to 12 blockage sensors 280. Seeds are metered by a seed or seed/fertilization module 16 or 426 for each section 300. MIU 152 receives global command signals from CDU 140 and returns monitored data. MIU 152 receives speed signals used to calculate seeding data from wheel speed sensor 302. MIU 152 also receives signals indicating whether implement 10 is up or down from sensor 304, and wheel speed signals from wheel speed sensor 302. Product application is disabled with implement 10 raised.

Sensor bus 274 is connected to a blockage module 278 associated with each section 300. MIU 152 monitors seed blockages based on signals received from modules 278, and sends blockage data to CDU 140 via bus 108. Bus 274 is also coupled to a gateway module 282 on each section 300 which receives product meter status signals from bin level sensors 284 and meter blockage sensors 290. Meter status data is transmitted back to CDU 140 via bus 108.

Referring to FIG. 12, MIU 152 controls the lighting, frame and marker systems of the Concord air drill. The lighting and marker control systems are as described in relation to FIGS. 7 and 10. The frame control system includes a solenoid circuit 432 with coils controlling the fluid applied to frame actuators. The coils include relays 434–440 to apply power to a main electric clutch 442 and clutches 444–448 coupled to three product bins.

Figure 13:
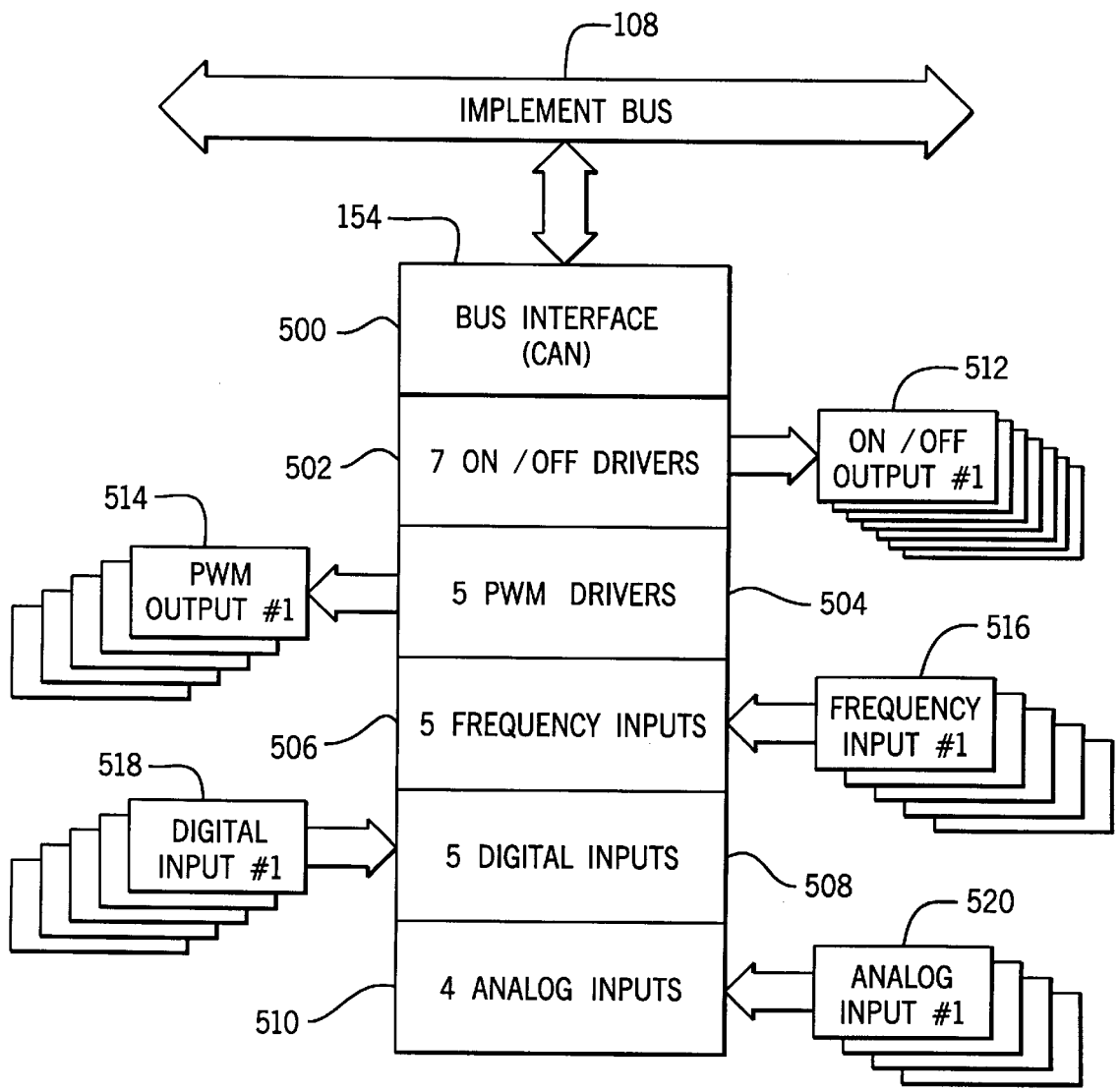
FIG. 13 is a block diagram of one multi-channel controller (MCC) of FIG. 3, and the interfaces between the MCC and other components of the control system.

Control system 100 may be upgraded by installing a removable MCC 154 on each frame section 300 to provide local variable-rate control. Referring to FIG. 13, each MCC 154 includes interfaces 500–510 for implement bus 108, on/off outputs 512 for driving valves, PWM outputs 514 for driving local product metering devices, frequency inputs 516, digital inputs 518, and analog inputs 520. Spare interfaces allow MCC 154 to be used in multiple applications. Connections between MCC 154 and control system 100 are shown below. MCC 154 is controlled by a processor 522 (FIG. 15; e.g., AN80C196CB) coupled to memory circuits (e.g., RAM, EEPROM, Flash EPROM).

Figure 14A:
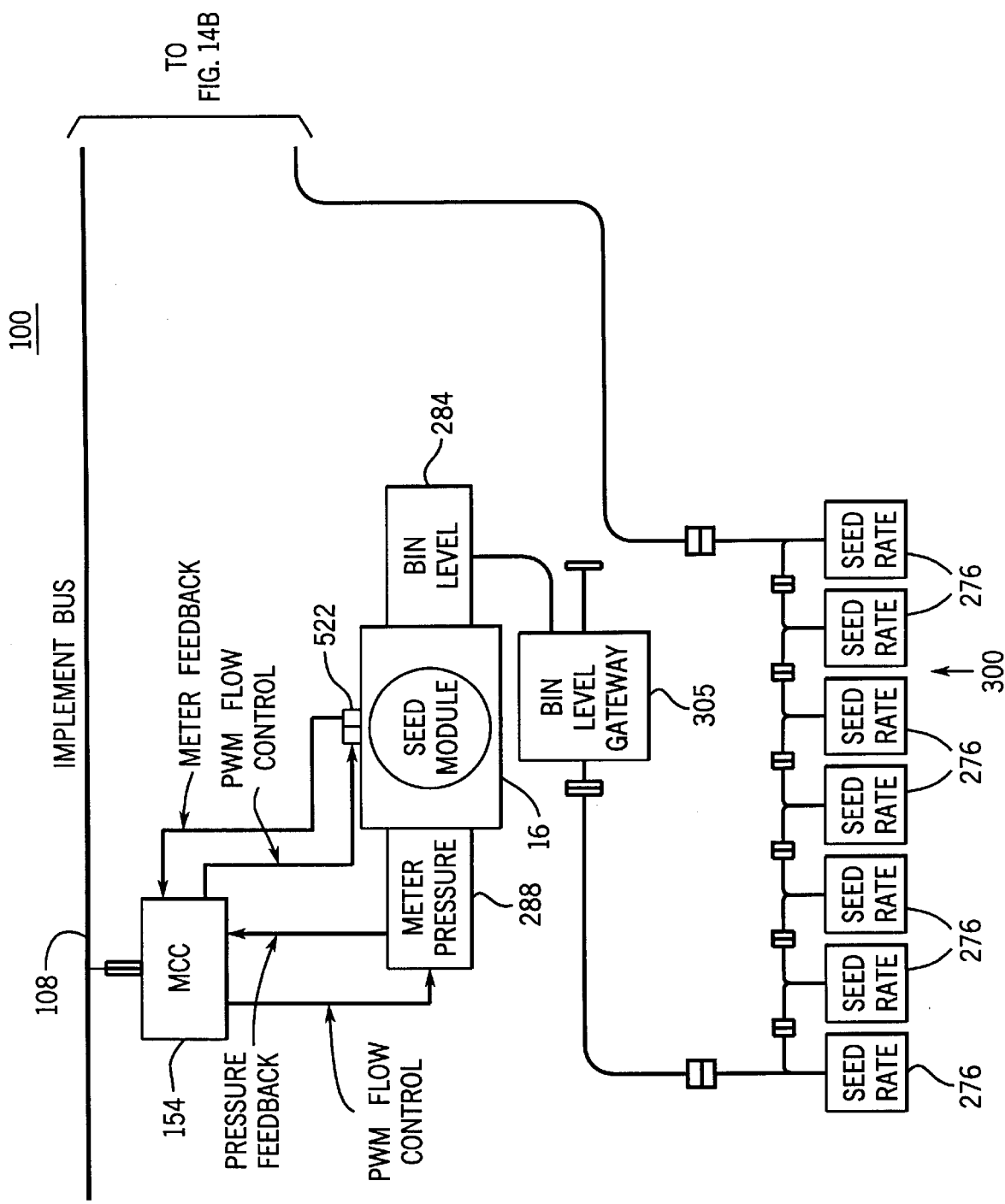
Figure 14C:
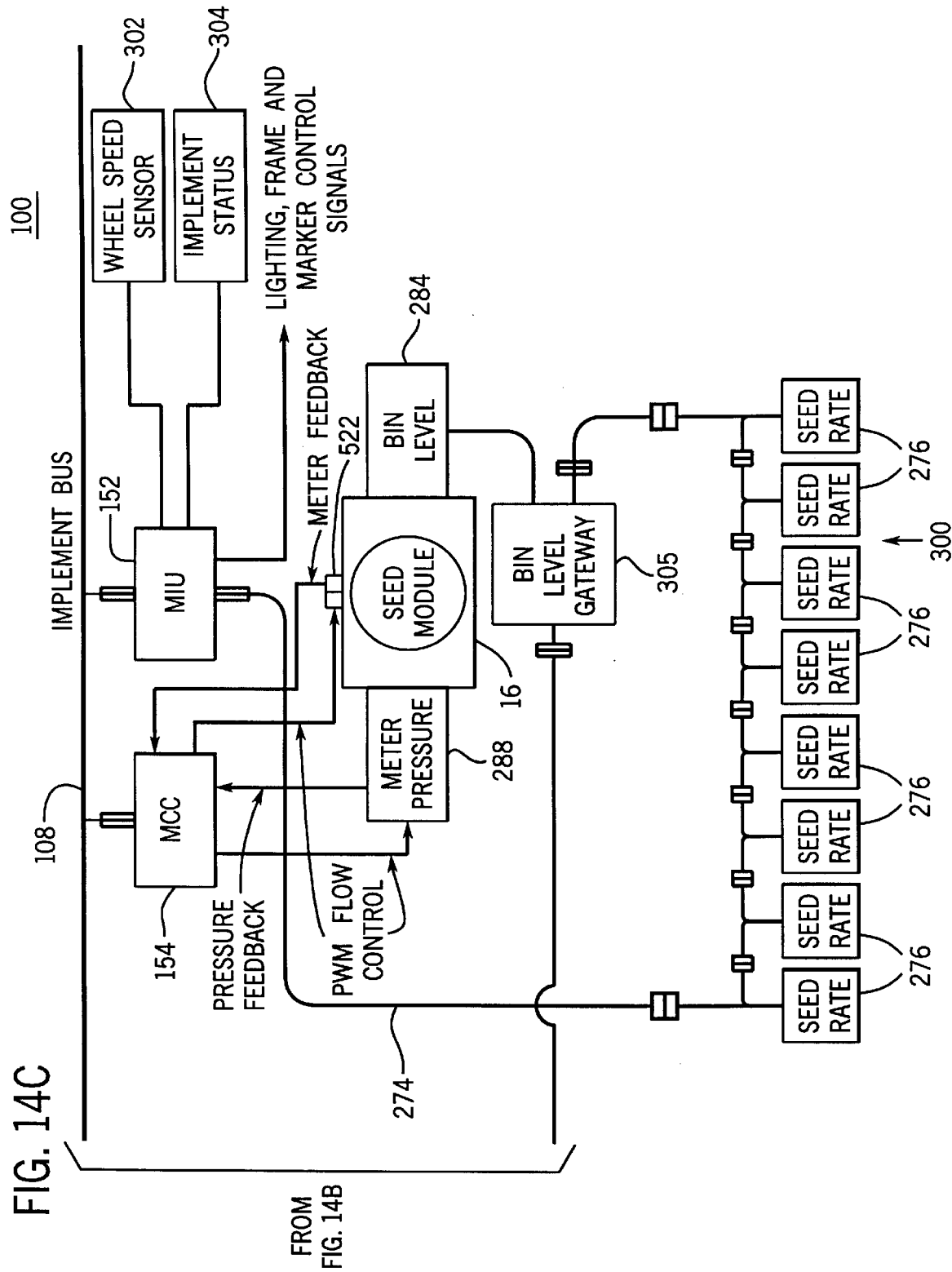

Referring to FIGS. 14A–14C, another embodiment of control system 100 also controls the cyclo planter. In contrast to FIGS. 6A–6C, however, MCCs 154 control the seed application rates of each section 300 based on rate command signals received from CDU 140 via bus 108. Each MCC 154 converts the rate command signals into control signals which are applied to a cyclo seed meter 522 (i.e., drum) on seed module 16. MCC 154 receives meter feedback speed signals from meter 522, and communicates meter speed data back to CDU 140 for display. MCC 154 can also use the meter speed feedback signals for closed-loop metering control. Each MCC 154 also applies control signals to bin pressure or material flow sensor 288, receives pressure feedback signals from sensor 288, and communicates bin pressure data back to CDU 140 for display.

Figure 15:
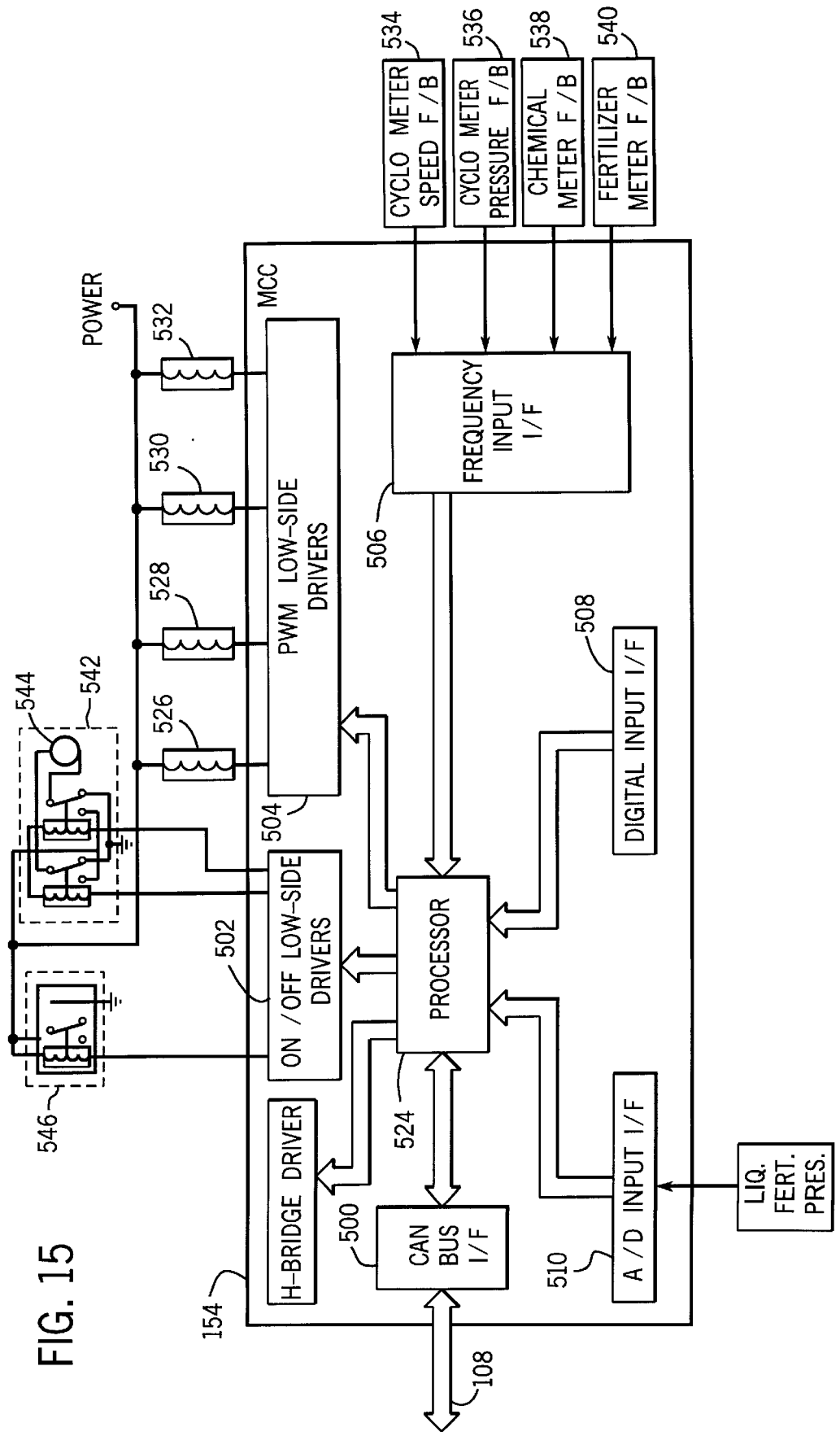
FIG. 15 is an electrical block diagram showing the MCC and interfaces between the MCC and metering systems (seed, chemical, fertilizer) of the planter in FIG. 14.

Referring to FIG. 15, when installed, each local MCC 154 controls product application rates for one section of implement 10. The controlled products may include seeds, granular chemicals and liquid fertilizers. Commands for each product being applied are received by MCC processor 524 from CDU 140. Processor 524 commands drivers 504 to generate PWM control signals based on the commands which are applied to a cyclo seed meter solenoid 526, a blower motor solenoid 528, a chemical meter solenoid 530 and a liquid fertilizer meter solenoid 532. Feedback signals are received from a cyclo seed meter speed sensor 534, a cyclo meter pressure sensor 536, a chemical meter speed sensor 538, and a fertilizer meter speed sensor 540.

Processor 524 may also control the variety of seeds being applied by generating variety control signals based upon command signals received from CDU 140. The control signals are applied to a relay circuit 542 which applies power to a variety selection switch 544 to select between two varieties of seeds. Processor 524 further controls a relay circuit 546 configured to open and shut a liquid fertilizer control valve for the local section 300.

Figure 16:
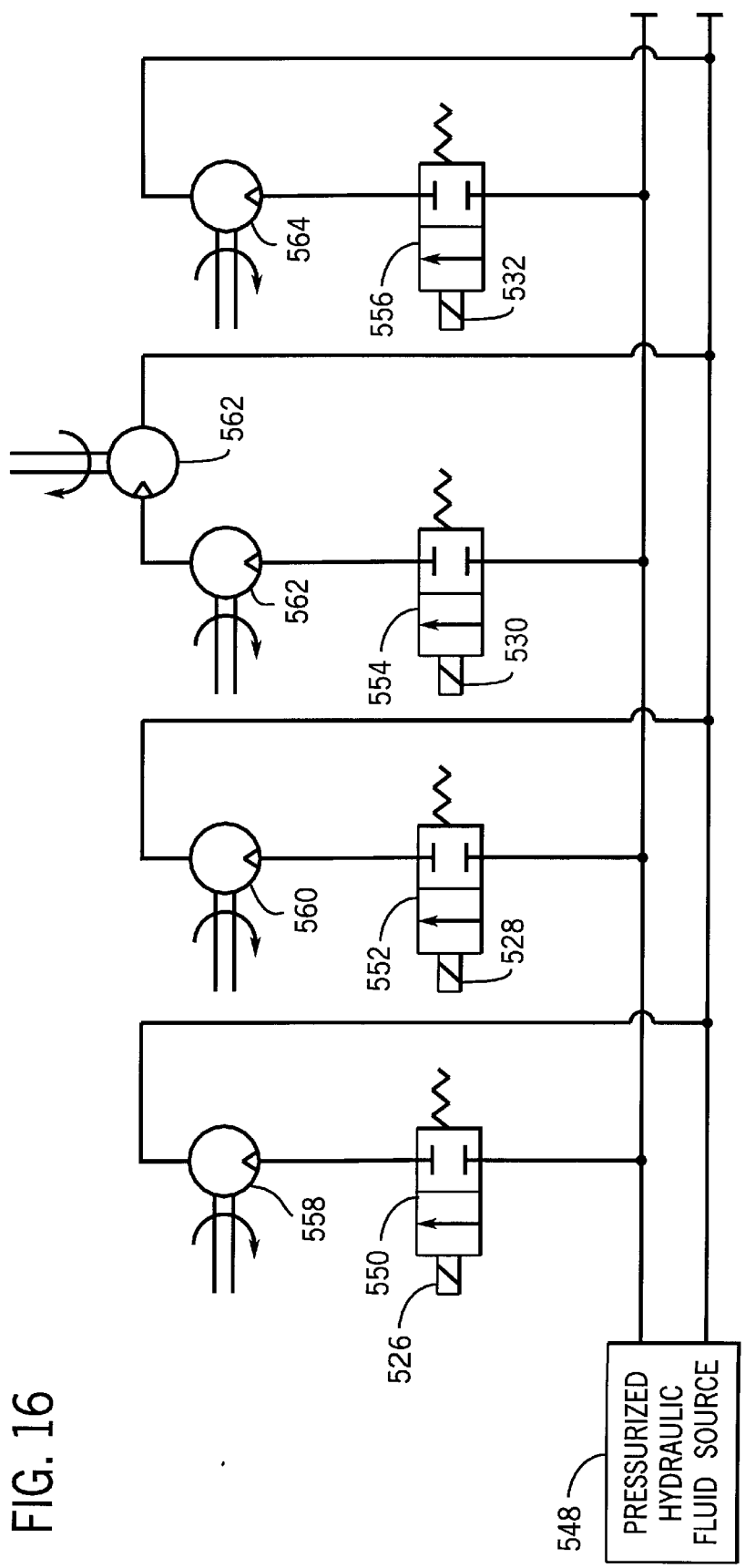
FIG. 16 is a hydraulic schematic showing interfaces between the hydraulic valves and motors (seed, blower, chemical, fertilizer) of the planter shown in FIG. 14.

Referring to FIG. 16, solenoids 526–532 control the flow of fluid from a pressurized hydraulic fluid source 548 through valves 550–556 to a seed drum motor 558, a blower motor 560, chemical motors 562 and a fertilizer motor 564. These motors control the seeding rate, fan speed, and chemical and fertilizer application rates.

Figure 17A:
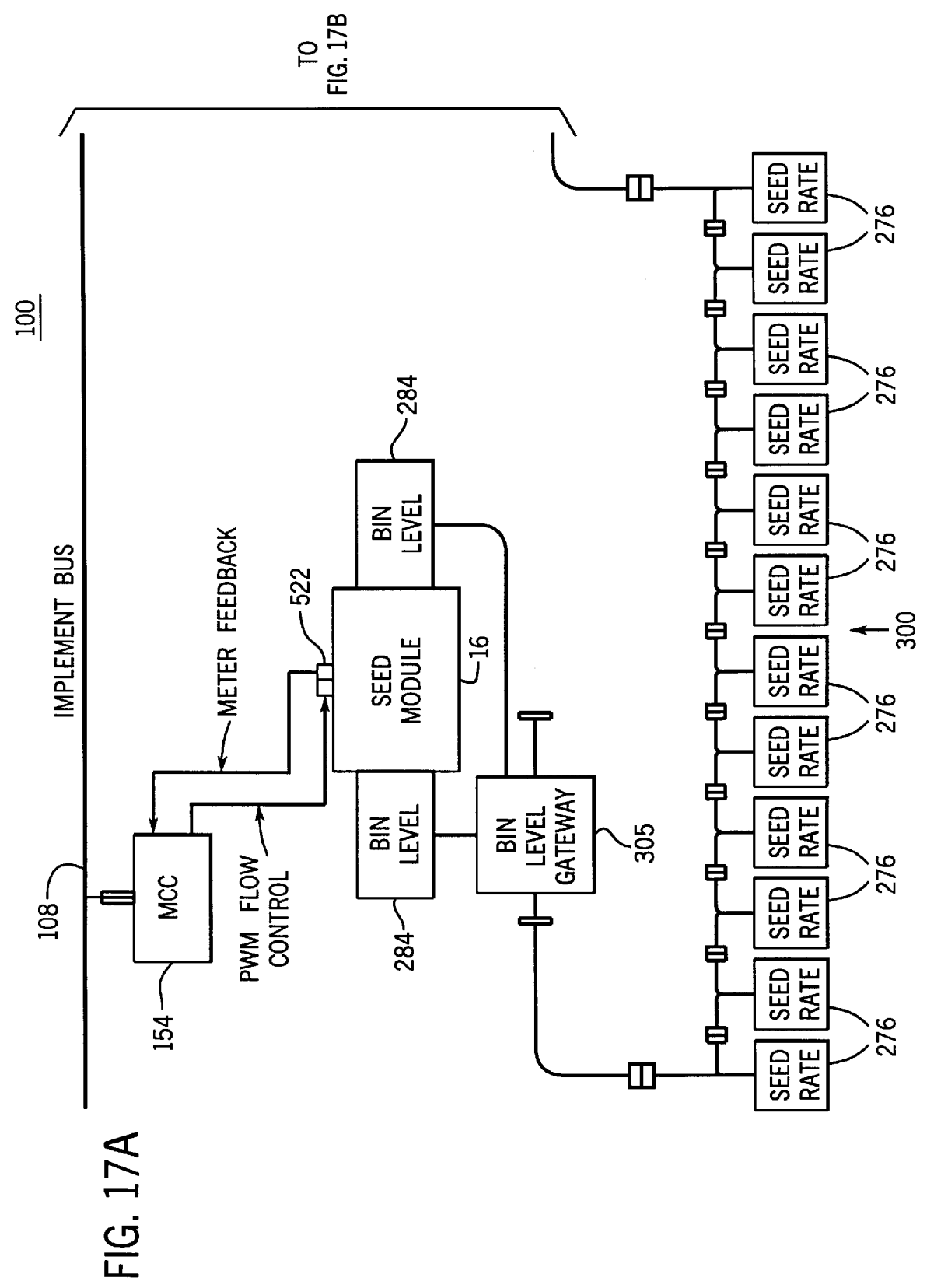
Figure 17B:
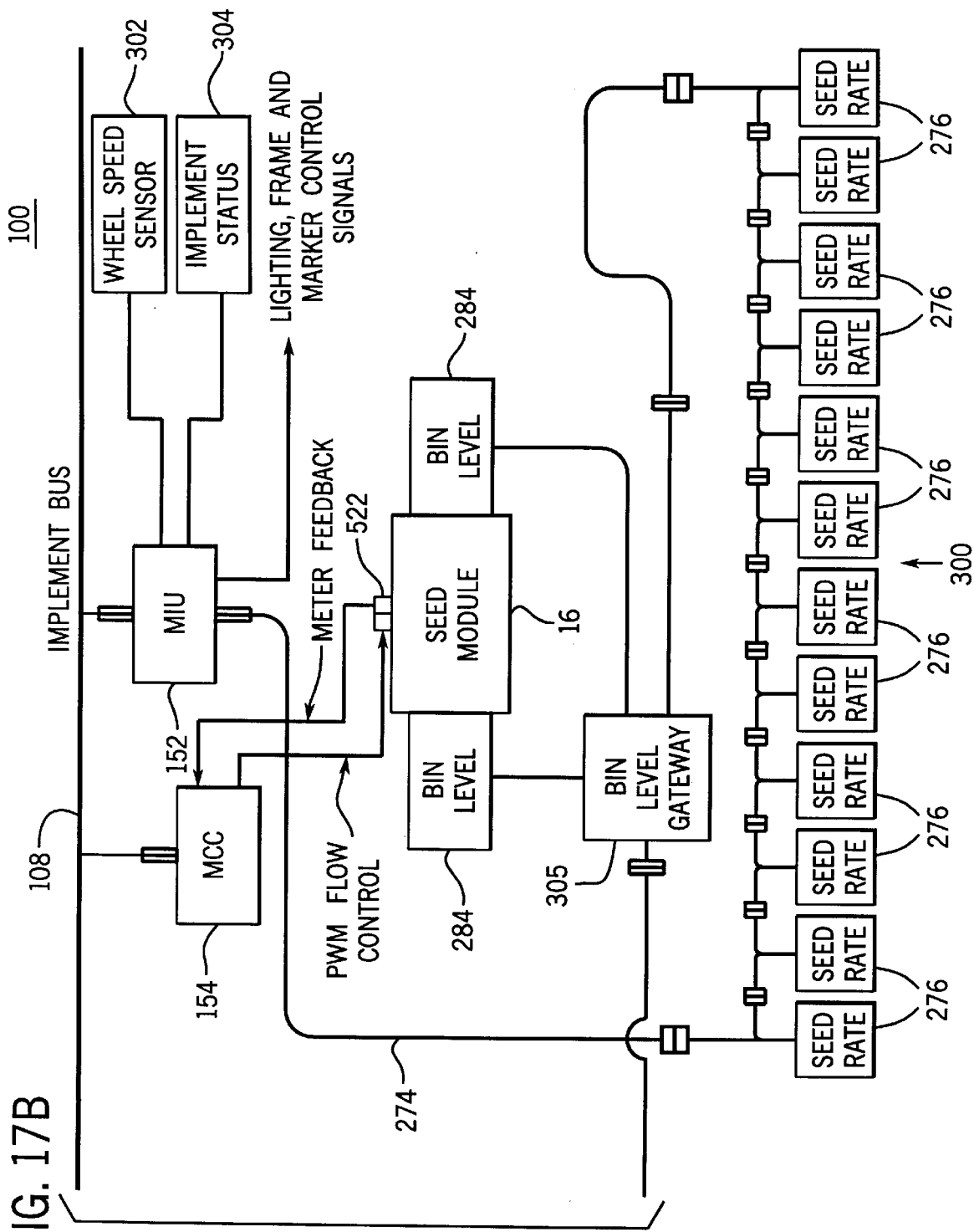

Referring to FIGS. 17A–17B, another embodiment of control system 100 controls a conventional drill. In contrast to the control system of FIGS. 9A–9B, however, MCCs 154 control the rates at which seeds are applied by the sections 300 using seed rate command signals received from CDU 140. Each MCC 154 converts the rate command signals into rate control signals which are applied to a seed meter 522 on each seed module 16. MCCs 154 receive feedback speed signals from meter 522, and communicate meter speed data back to CDU 140 for display. MCCs 154 can also use the speed feedback signals for closed-loop metering control.

Figure 18:
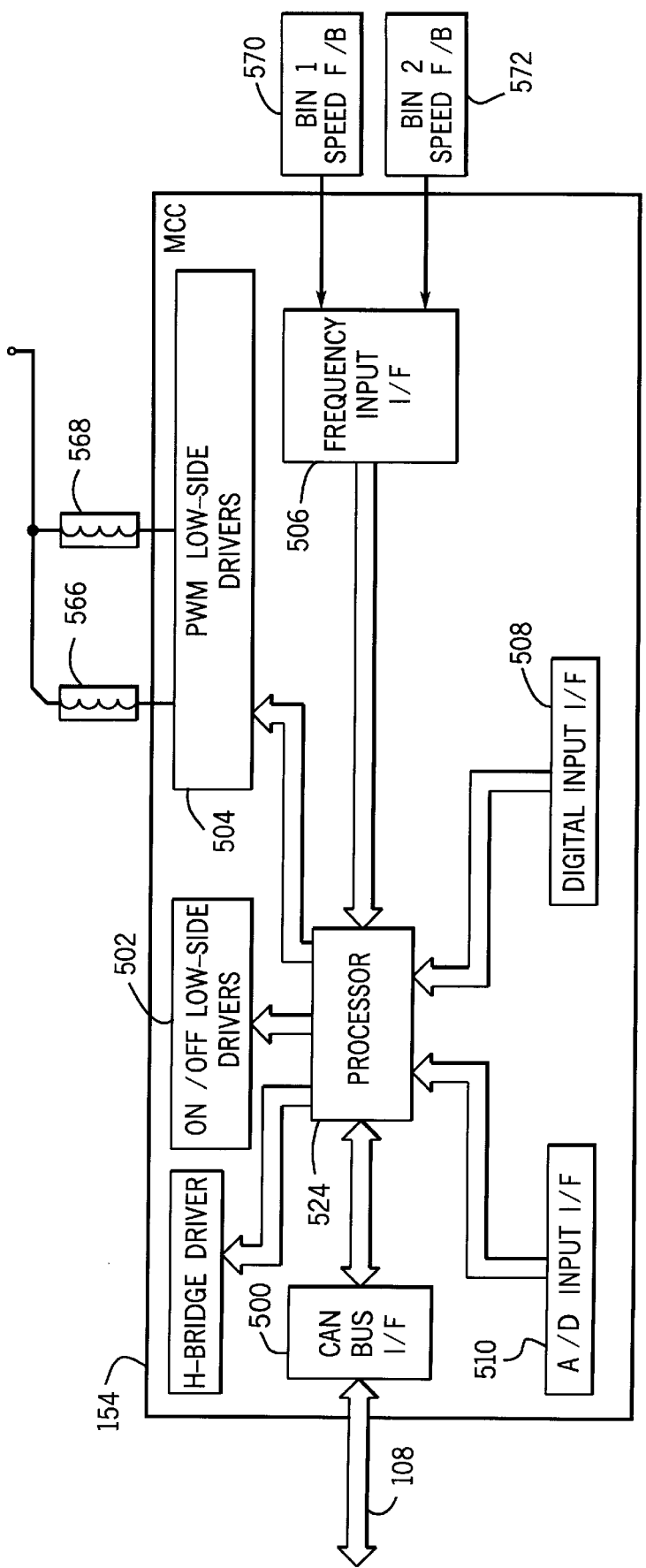
FIG. 18 is an electrical block diagram showing the MCC and the interfaces between the MCC and the metering systems (bins 1 and 2) of the drill shown in FIG. 17.

Referring to FIG. 18, when installed, each local MCC 154 controls product application rates for one section 300 of the conventional drill. Commands for each product being applied are received by MCC processor 524 from CDU 140. Based on the commands, drivers 504 are commanded to generate PWM control signals which are applied to metering device solenoids 566 and 568 for bins 1 and 2. Solenoids 566 and 568 control valves configured to supply fluid to hydraulic motors which dispense seeds from bins. Feedback signals are received from bin 1 and bin 2 meter speed sensors 570 and 572. These signals are sent to CDU 140 for display, or can be used for closed-loop control.

Figure 19A:
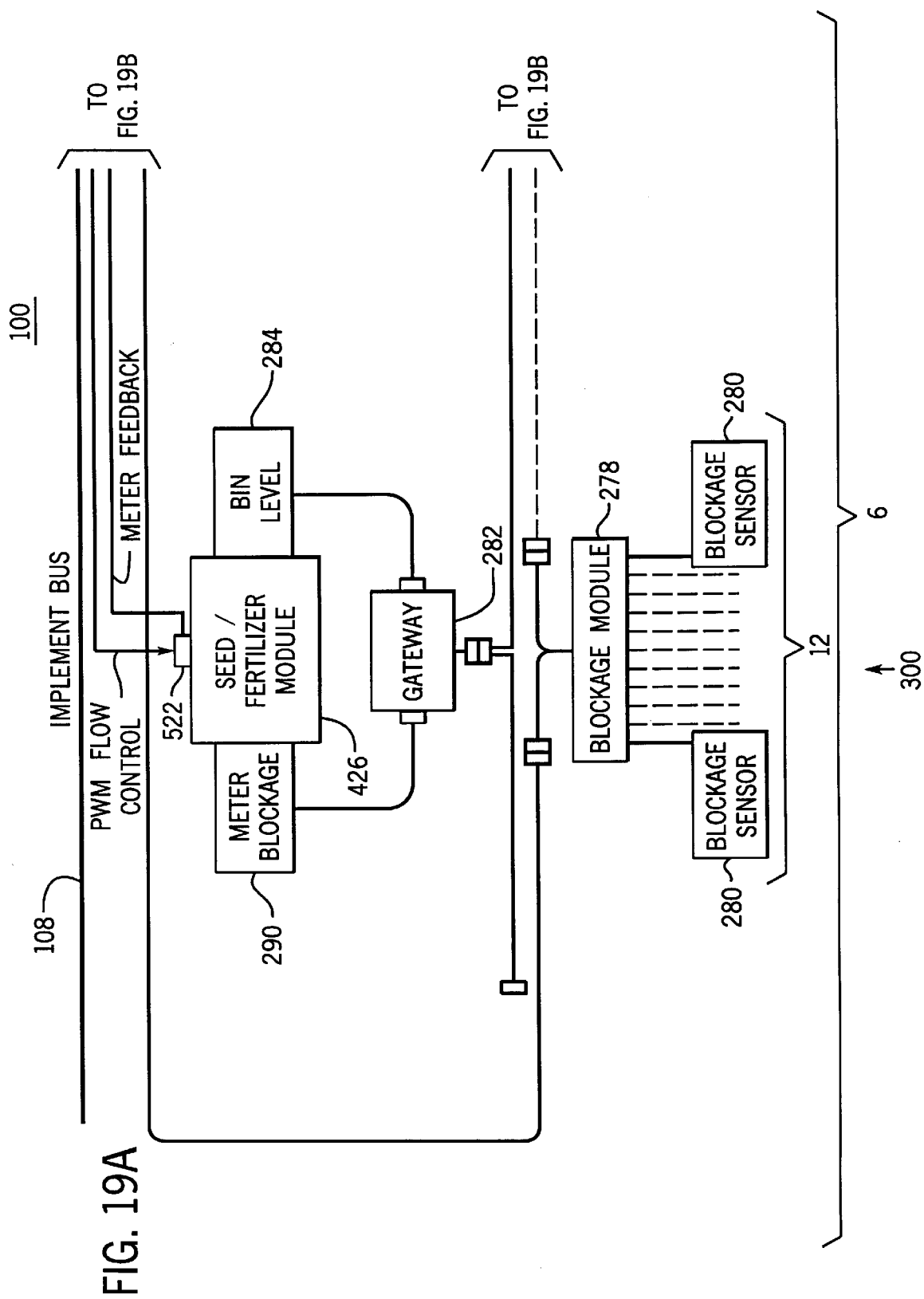

Referring to FIGS. 19A–19C, another embodiment of control system 100 is configured to control a Concord air drill. In contrast to the control system of FIGS. 11A–11C, however, a local MCC 154 controls the seed application rates of the implement's six sections 300 based upon seed rate command signals received from CDU 140. MCC 154 converts the rate command signals into control signals applied to meter 522 on seed module 16 or seed/fertilizer module 426. MCC 154 receives feedback speed signals from meter 522, and sends meter speed data back to CDU 140 for display. Feedback signals may also be used for closed-loop control. MCC 154 also applies control signals to fan speed sensor 428, receives speed feedback signals from sensor 428, and communicates fan speed data back to CDU 140 for display.

Figure 20:
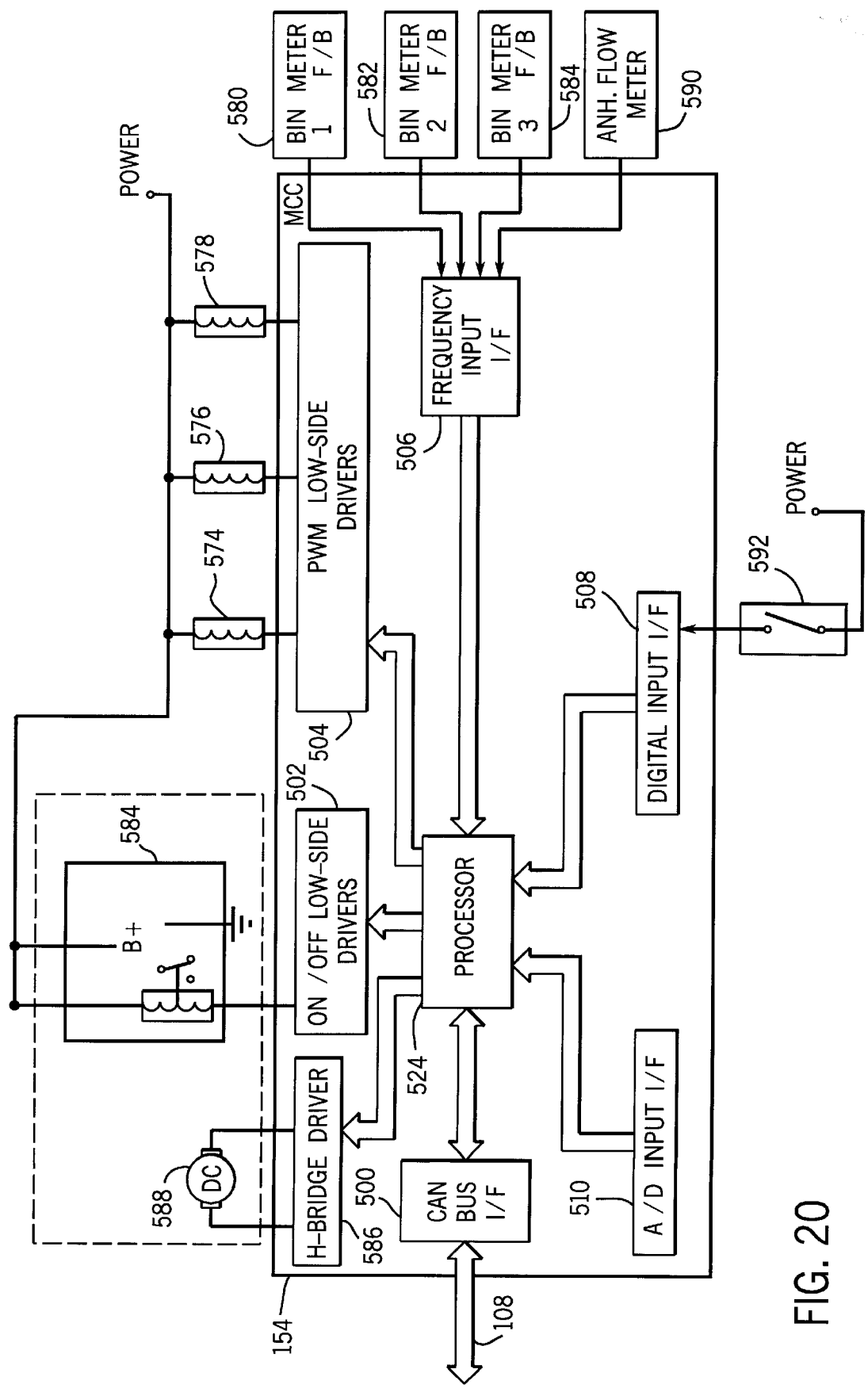
FIG. 20 is an electrical block diagram showing the MCC and the interfaces between the MCC and the metering systems (bins 1–3 and anhydrous) of the drill of FIG. 19 (e.g., Concord air drill).

Referring to FIG. 20, when installed, local MCC 154 controls the product application rates for the air drill. Commands for each product being applied are received by MCC processor 524 from CDU 140. Processor 524 commands drivers 504 based on the commands to generate PWM control signals applied to bin 1, bin 2 and bin 3 metering device solenoids 574–578. Solenoids 574–578 control hydraulic valves configured to supply fluid to motors to dispense seeds or seeds/fertilizer from bins. Feedback signals are received from bin 1, 2 and 3 meter speed sensors 580–584. Processor 524 further controls a relay circuit 584 which applies power to an anhydrous control valve. An H-bridge driver 586 drives an anhydrous flow control valve 588, and feedback signals are provided by a sensor 590. A switch 592 is provided to turn on and off the flow.

While the embodiments illustrated in the FIGURES and described above are presently preferred, it should be understood that these embodiments are offered by way of example only. The control system disclosed herein may be modified for use on other planters, conventional or air drills, other planting implements with variable-rate control, controlled plows, balers, material spreaders and other electronically-controlled implements. The present invention is not intended to be limited to any particular embodiment, but is intended to extend to modifications that nevertheless fall within the scope of the claims.

What is claimed is;:

1. A control system for an agricultural implement, the implement including a global output device for performing a global implement function in response to global control signals and further including a plurality of sections, each section including a local product metering device for applying a product to a row of a field in response to local control signals, the control system comprising:

a source of commands configured to generate global commands for the global function and product rate commands for each product metering device;

a global controller supported by the implement and configured to receive the global commands, to generate the global control signals from the global commands, and to apply the global control signals to the global output device; and a plurality of local controllers corresponding to the plurality of sections, each local controller configured to receive the product rate commands for the local product metering device, to generate the local control signals for the local product metering device from the product rate commands, and to apply the local control signals to the local product metering device.

2. The control system of claim 1 wherein the implement includes a frame and the global output device includes a plurality of frame lights, and the global controller generates the global control signals from the global commands to control the lights.

3. The control system of claim 2 wherein the source of commands includes a lighting interface from an agricultural vehicle, and the global controller receives first lighting commands from the interface, converts the first lighting commands to second lighting commands, and generates the global control signals from the second lighting commands.

4. The control system of claim 3 wherein the second lighting commands are based on the ASAE S279 standard.

5. The control system of claim 3 wherein the plurality of frame lights includes a turn signal lamp and an opposite turn signal lamp, and wherein the second lighting commands disable the opposite turn signal lamp when making a turn signal lamp is flashing.

6. The control system of claim 1 wherein the implement includes a frame with a plurality of moveable frame members, the global output device includes a plurality of actuators configured to move the frame members, and the global controller generates the global control signals to control the frame members.

7. The control system of claim 6 wherein the source of commands includes an operator interface at an operator station of a work vehicle, and the global controller receives frame commands from the operator interface and generates the global control signals in response thereto.

8. The control system of claim 1 wherein the implement includes a frame and a plurality of markers coupled thereto, the global output device includes a plurality of actuators configured to move the markers, and the global controller generates the global control signals to control the markers.

9. The control system of claim 8 wherein the source of commands includes an operator interface in a cab of an agricultural vehicle, and the global controller receives marker commands from the operator interface and generates the global control signals in response thereto.

10. The control system of claim 1 wherein the implement includes a frame with a plurality of moveable frame members and a plurality of markers, the global output device includes a plurality of lights coupled to the frame, a plurality of frame actuators configured to move the frame members and a plurality of marker actuators configured to move the markers, and the global controller the global control signals to control the lights, the frame members and the markers.

11. The control system of claim 10 wherein the source of commands includes a standard lighting connector on an agricultural vehicle and an operator interface in a cab of the vehicle, the global controller receives standard lighting commands from the connector and frame and marker commands from the operator interface and generates the global control signals in response to the lighting commands and the frame and marker commands.

12. The control system of claim 1 further comprising a plurality of sensors configured to sense rates at which products are applied to the field by the product metering devices and to generate signals representative thereof, wherein the global controller is further configured to monitor the sensed signals from the plurality of sensors.

13. The control system of claim 1 wherein the implement is a cyclo planter, the product metering device for each section includes a cyclo seed meter, and the local controller of each section generates the local control signals for controlling the rate at which seed is applied to the field by the cyclo seed meter.

14. The control system of claim 13 also including a cyclo meter speed sensor configured to sense the speed of each cyclo seed meter and to generate a cyclo meter speed signal therefrom, wherein each local controller uses the cyclo meter speed signal as a speed feedback signal.

15. The control system of claim 13 wherein the product metering device for each section also includes a granular chemical meter, and the product being applied also includes a granular chemical.

16. The control system of claim 13 wherein the product metering device for each section also includes a liquid flow meter, and the product being applied also includes a liquid chemical.

17. The control system of claim 13 wherein the implement also includes a blower motor for each section, and the local controller for each section generates local blower motor control signals to control the blower motor.

18. The control system of claim 1 wherein the implement is a drill, the product metering device for each section includes a local seed meter, and the local controller of each section generates the local control signals for controlling the rate at which seed is applied to the field by the local seed meter.

19. A control system for an implement coupled to a work vehicle having an operator station, the implement including a global output device for performing a global implement function in response to global control signals and further including a plurality of sections, each section including a local product metering device for applying a product to a row of a field in response to local control signals, the control system comprising:

an implement data bus running between the operator station and the implement;

an operator interface located at the operator station and coupled to the bus, the operator interface configured to generate global commands on the bus for the global implement function and product rate commands on the bus for the local product metering devices;

a global controller supported by the implement and coupled to the bus, the global controller configured to receive the global commands on the bus and to generate the global control signals therefrom; and a plurality of local controllers, each local controller located on one section, coupled to the bus, and configured to receive the product rate commands on the bus for the local product metering device for the section and to generate the local control signals for the local product metering device therefrom.

20. The control system of claim 19 wherein the bus follows a Controller Area Network (CAN) protocol.

21. The control system of claim 19 wherein the global output device includes a plurality of devices selected from the group consisting of implement lights, frame actuators and marker actuators, and the global controller generates the global control signals to control the selected global output devices.

22. The control system of claim 19 wherein the implement is selected from the group consisting of a planter, a conventional drill and an air drill, and the local controllers generate the local control signals to control the local product metering device of the selected implement.

23. An implement coupled to an agricultural vehicle including a cab, an operator interface located in the cab and a data bus running between the operator interface and the implement, the operator interface being configured to generate global implement commands and local application rate commands on the data bus, the implement comprising:

a frame including a plurality of sections, each section including a metering device configured to apply a product to multiple rows of a field in response to local control signals;

a global output device coupled to the frame and configured to perform a global implement function in response to global control signals;

a global controller supported by the implement, coupled to the data bus and configured to receive the global implement commands from the data bus and to generate the global control signals therefrom; and a plurality of local controllers coupled to the data bus, each local controller configured to receive the local application rate commands from the data bus for the metering device for one section and to generate the local control signals for the local metering device therefrom.

* * * * *

UNITED STATES PATENT AND TRADEMARK OFFICE
CERTIFICATE OF CORRECTION

PATENT NO. : 5,924,371
DATED : July 20, 1999
INVENTOR(S) : David D. Flamme; Abraham Orbach; Paul W. Haack; Eric D. Jacobson.

It is certified that error appears in the above-indentified patent and that said Letters Patent is hereby corrected as shown below:

In Claim 5, Line 7, delete "signal lamp is flashing".

In Claim 10, Line 33, insert --generates-- after "controller".

In Claim 11, Line 36, delete "standard".

In Claim 11, Line 38, delete "standard".

In Claim 23, Line 35, delete the second occurrence of "local".

Signed and Sealed this

Fifth Day of September, 2000

Attest:

Q. TODD DICKINSON

*Attesting Officer*     *Director of Patents and Trademarks*